United States Patent
Kim et al.

(10) Patent No.: US 12,096,482 B2
(45) Date of Patent: *Sep. 17, 2024

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: Donggun Kim, Suwon-si (KR); Jaehyuk Jang, Suwon-si (KR); Anil Agiwal, Bangalore (IN); Sangkyu Baek, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,083

(22) Filed: Oct. 7, 2022

(65) Prior Publication Data

US 2023/0112196 A1 Apr. 13, 2023

Related U.S. Application Data

(63) Continuation of application No. 17/250,279, filed as application No. PCT/KR2019/007891 on Jun. 28, 2019, now Pat. No. 11,470,652.

(30) Foreign Application Priority Data

Jun. 29, 2018 (KR) .................. 10-2018-0075593

(51) Int. Cl.
*H04W 74/0833* (2024.01)
*H04W 74/04* (2009.01)
(Continued)

(52) U.S. Cl.
CPC ....... *H04W 74/0833* (2013.01); *H04W 74/04* (2013.01); *H04W 74/0891* (2013.01); *H04W 76/27* (2018.02)

(58) Field of Classification Search
CPC ............. H04W 74/04; H04W 74/0833; H04W 74/0891; H04W 76/27
See application file for complete search history.

(56) References Cited

U.S. PATENT DOCUMENTS 11,240,847 B2   2/2022   Wang et al.
11,470,652 B2 * 10/2022   Kim ................. H04W 74/0833
(Continued)

FOREIGN PATENT DOCUMENTS

CN   101589566 A   11/2009
CN   101674661 A    3/2010
(Continued)

OTHER PUBLICATIONS

International Search Report and Written Opinion of the International Searching Authority in connection with International Application No. PCT/KR2019/007891 dated Oct. 2, 2019, 10 pages.
(Continued)

*Primary Examiner* — Kashif Siddiqui

(57) ABSTRACT

Provided is a method of performing a random access procedure, the method including: selecting, from among a plurality of Synchronization Signal Blocks (SSBs), a first SSB that exceeds a threshold value of signal power; transmitting a contention-based random access preamble corresponding to the first SSB; receiving a first Random Access Response (RAR) corresponding to the contention-based random access preamble; obtaining a first Media Access Control Protocol Data Unit (MAC PDU) corresponding to a size of uplink (UL) resource allocation in the first RAR; transmitting a message3 (Msg3) including the first MAC PDU; determining, by transmitting the Msg3, whether contention is resolved; and when the contention is not resolved, performing a contention-free random access procedure.

10 Claims, 20 Drawing Sheets

(51) Int. Cl.
*H04W 74/08* (2024.01)
*H04W 76/27* (2018.01)

(56) References Cited

U.S. PATENT DOCUMENTS

| | | | |
|---|---|---|---|
| 2005/0047429 A1* | 3/2005 | Koo | H04W 52/0216 370/335 |
| 2009/0196244 A1 | 8/2009 | Chun et al. | |
| 2010/0178941 A1 | 7/2010 | Chun et al. | |
| 2012/0320842 A1 | 12/2012 | Jeong et al. | |
| 2013/0021993 A1 | 1/2013 | Chou | |
| 2013/0188592 A1 | 7/2013 | Yang et al. | |
| 2014/0241262 A1* | 8/2014 | Novak | H04W 72/23 370/329 |
| 2019/0182682 A1 | 6/2019 | Kim et al. | |
| 2019/0364605 A1* | 11/2019 | Loehr | H04W 72/21 |

FOREIGN PATENT DOCUMENTS

| | | |
|---|---|---|
| CN | 104185293 A | 12/2014 |
| CN | 107135522 A | 9/2017 |
| CN | 107919897 A | 4/2018 |
| KR | 10-2011-0053730 A | 5/2011 |
| KR | 10-2018-0017909 A | 2/2018 |

OTHER PUBLICATIONS

3GPP TS 38.321 V15.2.0 (Jun. 2018), Technical Specification, 3rd Generation Partnership Project; Technical Specification Group Radio Access Network; NR; Medium Access Control (MAC) protocol specification (Release 15), Jun. 2018, 72 pages.
Asustek, "Discussion on Random Access Preamble selection for Handover," R2-1806919, 3GPP TSG-RAN WG2 Meeting #102, Busan, Korea, May 21-25, 2018, 4 pages.
ZTE, "Remaining details of RACH procedure," R1-1805945, 3GPP TSG RAN WG1 Meeting #93, Busan, Korea, May 21-25, 2018, 15 pages.
Written Opinion of the International Searching Authority dated Oct. 2, 2019 in connection with International Patent Application No. PCT/KR2019/007891, 5 pages.
European Patent Office, "Supplementary European Search Report" issued Aug. 5, 2021, in connection with European Patent Application No. 19825426.0, 10 pages.
Nokia, "TP on beam recovery", 3GPP TSG-RAN WG2 #100, R2-1714047, Reno, USA, Nov. 27, 2017-Dec. 1, 2017, 7 pages.
Office Action dated Oct. 6, 2022 in connection with India Patent Application No. 202137001778, 7 pages.
Grounds of Rejection dated Aug. 7, 2023, in connection with Korean Application No. 10-2018-0075593, 6 pages.
The First Office Action dated Sep. 25, 2023, in connection with Chinese Application No. 201980056709.4, 17 pages.
Communication pursuant to Article 94(3) EPC dated Sep. 21, 2023, in connection with European Application No. 19825426.0, 6 pages.
Rossi et al., "On the UMTS RLC Parameters Setting and their Impact on Higher Layers Performance," 2003 IEEE 58th Vehicular Technology Conference. VTC 2003-Fall (IEEE Cat. No. 03CH37484), Oct. 6, 2003, 6 pages.
The Second Office Action dated Mar. 6, 2024, in connection with Chinese Application No. 201980056709.4, 14 pages.
Hearing Notice dated Mar. 13, 2024, in connection with Indian Application No. 202137001778, 3 pages.

* cited by examiner

METHOD AND APPARATUS FOR TRANSMITTING AND RECEIVING DATA IN WIRELESS COMMUNICATION SYSTEM

CROSS-REFERENCE TO RELATED APPLICATIONS

This application is a continuation of application Ser. No. 17/250,279, now U.S. Pat. No. 11,470,652, which is the 371 National Stage of International Application No. PCT/KR2019/007891, filed Jun. 28, 2019, which claims priority to Korean Patent Application No. 10-2018-0075593, filed Jun. 29, 2018, the disclosures of which are herein incorporated by reference in their entirety.

BACKGROUND

1. Field

The disclosure relates to a method and apparatus for transmitting and receiving data in a wireless communication system.

2. Description of Related Art

To meet increasing demand with respect to wireless data traffic after the commercialization of $4^{th}$ generation (4G) communication systems, efforts have been made to develop evolved $5^{th}$ generation (5G) system or pre-5G communication system. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud Radio Access Networks (Cloud-RAN), ultra-dense networks, Device-To-Device communication (D2D), wireless backhaul, moving networks, cooperative communication, Coordinated Multi-Points (CoMP), interference cancellation, or the like have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), sparse code multiple access (SCMA), or the like have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, Machine-To-Machine (M2M) communication, and Machine-Type Communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication technologies such as sensor networks, M2M communication, MTC, or the like are being implemented by using techniques including beamforming, MIMO, array antennas, or the like. Application of Cloud-RAN as the above-described big data processing technology may be an example of convergence of 5G communication technology and IoT technology.

Because various services may be provided due to the aforementioned technical features and the development of wireless communication systems, methods for effectively providing these services are required.

SUMMARY

Disclosed embodiments provide an apparatus and method for effectively providing a service in a mobile communication system.

Disclosed embodiments provide an apparatus and method for effectively providing a service in a mobile communication system.

Disclosed embodiments can effectively provide a service in a mobile communication system.

DETAILED DESCRIPTION

Figure 1A:
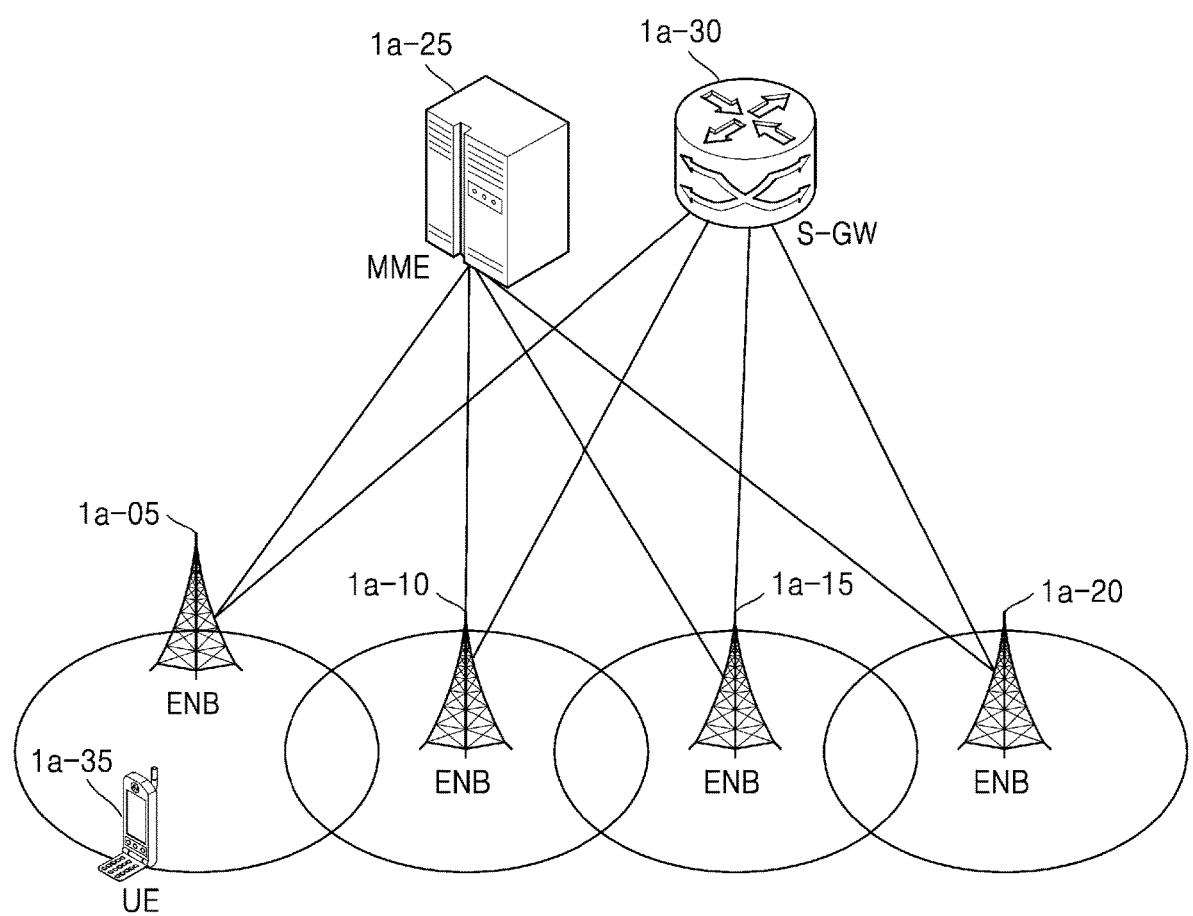
FIG. 1A is a diagram illustrating a configuration of a long term evolution (LTE) system, according to some embodiments of the disclosure.

According to an embodiment of the disclosure, a method of performing a random access procedure, the method being performed by a user equipment (UE), includes: selecting, from among a plurality of Synchronization Signal Blocks (SSBs), a first SSB that exceeds a threshold value of signal power; transmitting a contention-based random access preamble corresponding to the first SSB; receiving a first Random Access Response (RAR) corresponding to the contention-based random access preamble; obtaining a first Media Access Control Protocol Data Unit (MAC PDU) corresponding to a size of uplink (UL) resource allocation in the first RAR;
transmitting a message3 (Msg3) including the first MAC PDU; determining, by transmitting the Msg3, whether contention is resolved; and when the contention is not resolved, performing a contention-free random access procedure.

The first MAC PDU may be obtained from a multiplexing and assembly entity.

The first MAC PDU may include a Cell-Radio Network Temporary Identifier Media Access Control Control Element (C-RNTI MAC CE).

The method may further include storing the first MAC PDU in an Msg3 buffer.

The performing of the contention-free random access procedure may include: selecting a second SSB exceeding the threshold value of the signal power, from among a plurality of SSBs to which contention-free random access preambles are allocated; transmitting a contention-free random access preamble corresponding to the second SSB; receiving a second RAR corresponding to the contention-free random access preamble; obtaining the first MAC PDU; obtaining a second MAC PDU, based on the first MAC PDU; and transmitting the second MAC PDU.

The obtaining of the first MAC PDU may include: determining whether the first MAC PDU is stored in an Msg3 buffer; and based on a result of the determining, obtaining the first MAC PDU from the Msg3 buffer.

The obtaining of the second MAC PDU based on the first MAC PDU may include: comparing a size of UL resource allocation in the second RAR with a size of the first MAC PDU; and based on a result of the comparing, obtaining the second MAC PDU to include, in subsequent UL transmission, at least one MAC subProtocol Data Unit (MAC subPDU) in the first MAC PDU.

The second MAC PDU may be obtained from a multiplexing and assembly entity.

The method may further include deleting data in the Msg3 buffer.

The determining of whether the contention is resolved may include determining whether a response to the Msg3 is received until a ra-ContentionResolution timer is expired.

According to an embodiment of the disclosure, a user equipment (UE) performing a random access procedure includes: a transceiver; and at least one controller coupled with the transceiver and configured to select, from among a plurality of Synchronization Signal Blocks (SSBs), a first SSB that exceeds a threshold value of signal power, transmit a contention-based random access preamble corresponding to the first SSB, receive a first Random Access Response (RAR) corresponding to the contention-based random access preamble, obtain a first Media Access Control Protocol Data Unit (MAC PDU) corresponding to a size of uplink (UL) resource allocation in the first RAR, transmit a message3 (Msg3) including the first MAC PDU, determine, by transmitting the Msg3, whether contention is resolved, and when the contention is not resolved, perform a contention-free random access procedure.

The at least one controller may be further configured to select a second SSB exceeding the threshold value of the signal power, from among a plurality of SSBs to which contention-free random access preambles are allocated, transmit a contention-free random access preamble corresponding to the second SSB, receive a second RAR corresponding to the contention-free random access preamble, obtain the first MAC PDU, obtain a second MAC PDU, based on the first MAC PDU, and transmit the second MAC PDU.

The at least one controller may be further configured to determine whether the first MAC PDU is stored in an Msg3 buffer, and based on a result of the determining, obtain the first MAC PDU from the Msg3 buffer.

The at least one controller may be further configured to compare a size of UL resource allocation in the second RAR with a size of the first MAC PDU, and based on a result of the comparing, obtain the second MAC PDU to include, in subsequent UL transmission, at least one MAC subProtocol Data Unit (MAC subPDU) in the first MAC PDU.

The second MAC PDU may be obtained from a multiplexing and assembly entity.

Hereinafter, operation principles of the disclosure will be described in detail with reference to accompanying drawings. In the following descriptions of the disclosure, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to embodiments described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. Throughout the specification, like reference numerals refer to like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the present embodiment refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in embodiments.

In the following descriptions of the disclosure, well-known functions or configurations are not described in detail because they would obscure the disclosure with unnecessary details. Hereinafter, embodiments of the disclosure will be described in detail with reference to accompanying drawings.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

For convenience of descriptions, the disclosure uses terms and names defined in the $3^{rd}$ Generation Partnership Project (3GPP) long term evolution (LTE) standards. However, the disclosure is not limited to these terms and names, and may be equally applied to communication systems conforming to other standards. In the disclosure, an evolved node B (eNB) may be interchangeably used with a next-generation node B (gNB) for convenience of explanation. That is, a base station described by an eNB may represent a gNB. In the disclosure, the term "terminals" may refer to not only mobile phones, narrowband IoT (NB-IoT) devices, and sensors but also other wireless communication devices. In the following description, the term "base station" refers to an entity for allocating resources to a user equipment and may be used interchangeably with at least one of a gNode B, an eNode B, a node B, a base station (BS), a radio access unit, a base station controller (BSC), or a node over a network The term "terminal" may be used interchangeably with a user equipment (UE), a mobile station (MS), a cellular phone, a smartphone, a computer, or a multimedia system capable of performing communication functions. However, the disclosure is not limited to the aforementioned examples.

In particular, the disclosure may be applied to 3GPP New Radio (NR) (5G mobile communication standard). The disclosure is applicable to intelligent services (e.g., smart home, smart building, smart city, smart car or connected car, health care, digital education, retail, security, and safety services) based on 5G communication technology and Internet of things (IoT) technology. In the disclosure, an eNB may be interchangeably used with a gNB for convenience of explanation. That is, a BS described by an eNB may represent a gNB. In the disclosure, the term "terminals (UEs)" may refer to not only mobile phones, NB-IoT devices, and sensors but also other wireless communication devices.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-Advanced (LTE-A), and LTE-Pro of the 3GPP, high rate packet data (HRPD) and ultra mobile broadband (UMB) of 3GPP2, 802.16e of the Institute of Electrical and Electronic Engineers (IEEE), or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an UL. The UL refers to a radio link through which a UE (also referred to as a mobile station (MS)) transmits data or a control signal to a BS (e.g., eNB), and the DL refers to a radio link through which a BS transmits data or a control signal to a UE. The above-described multiconnection scheme distinguishes between data or control information of different users by assigning time-frequency resources for the data or control information of the users not to overlap each other, i.e., to achieve orthogonality therebetween.

Post-LTE systems, that is, 5G systems need to simultaneously support services capable of reflecting and satisfying various requirements of users, service providers, etc. Services considered for the 5G systems include enhanced mobile broadband (eMBB), massive machine-type communication (mMTC), ultra-reliability low-latency communication (URLLC) services or the like.

According to some embodiments, the eMBB service may be aimed to provide a more enhanced data rate compared to a data rate supported by LTE, LTE-A, or LTE-Pro. For example, the eMBB service in the 5G communication systems needs to provide a maximum data rate of 20 gigabits per second (Gbps) for a DL and provide a maximum data rate of 10 Gbps for a UL in view of a single BS. At the same time, the 5G communication systems may simultaneously provide a maximum data rate and provide an increased user perceived data rate. To satisfy these requirements, the 5G communication systems may require various enhanced transmission/reception technologies including enhanced multiple-input and multiple-output (MIMO). The data rate required for the 5G communication systems may be satisfied by using a frequency bandwidth wider than 20 megahertz (MHz) in a frequency band of 3 to 6 GHz or over 6 GHz compared to LTE systems currently using a transmission bandwidth of up to 20 MHz in a 2 GHz band.

At the same time, the mMTC service is considered for the 5G communication systems to support application services such as IoT. The mMTC service may be required to, for example, support massive user access within a cell, enhance UE coverage, increase battery time, and reduce user charges, to efficiently provide the IoT service. The IoT service provides a communication function by using a variety of sensors attached to various devices, and thus needs to support a large number of UEs within a cell (e.g., 1,000,000 UEs/km2. In addition, because UEs supporting mMTC may be located in a shadow zone, e.g., a basement of a building, due to service characteristics, the mMTC service may require a wider coverage compared to other services provided by the 5G communication systems. The UEs supporting mMTC need to be low-priced, and are not able to frequently replace batteries and thus require a very long battery life time, e.g., 10 to 15 years.

Lastly, the URLLC service is a mission-critical cellular-based wireless communication service and may be used for remote control of robots or machinery, industrial automation, unmanned aerial vehicles, remote healthcare, emergency alert, etc. Thus, URLLC communication may have to provide a very low latency (e.g., ultra-low latency) and a very high reliability (e.g., ultra-reliability). For example, the URLLC service needs to satisfy an air interface latency smaller than 0.5 millisecond (ms) and, at the same time, may require a packet error rate equal to or smaller than $10^{-5}$. Therefore, for the URLLC service, the 5G communication systems need to provide a smaller transmit time interval (TTI) compared to other services and, at the same time, may be required to broadly allocate resources in a frequency band to ensure reliability of a communication link.

The above-described three services considered for the 5G communication systems, i.e., the eMBB, URLLC, and mMTC services, may be multiplexed and provided by a single system. In this case, the services may use different transmission/reception schemes and different transmission/reception parameters to satisfy different requirements for the services. The above-described mMTC, URLLC, and eMBB services are merely examples and the types of services to which the disclosure is applicable are not limited thereto.

Although LTE, LTE-A, LTE Pro, or 5G (or NR) systems are mentioned as examples in the following description, embodiments of the disclosure may also be applied to other communication systems having similar technical backgrounds or channel types. Furthermore, the embodiments of the disclosure may also be applied to other communication systems through partial modification without greatly departing from the scope of the disclosure based on determination by one of ordinary skill in the art.

In the disclosure, provided are a method and apparatus for efficiently supporting a Secondary Cell (Scell) Radio Link Failure (RLF) in a next-generation mobile communication system, and a method by which a connected-UE can generate and transmit a message3 (Msg3) when the connected-UE performs a random access.

In the wireless communication system, in order to support lower transmission latency and guarantee higher reliability, packet duplication transmission may be applied to and used for a UL and a DL. According to the packet duplication transmission, a same packet is duplicately transmitted through two Radio Link Control (RLC) entities, and when a retransmission count with respect to certain data exceeds in one of the two RLC entities which is connected to a Scell, the one RLC entity declares a Scell RLF. That is, a UE may report, to a BS by using a Radio Resource Control (RRC) message, that a maximum retransmission count with respect to certain data exceeds in the RLC entity connected to the Scell, and this may be referred to as the Scell RLF. According to some embodiments of the disclosure, during a procedure of triggering and transmitting a Scell RLF, provided is a method of preventing the Scell RLF from being unnecessarily triggered several times, and efficiently managing parameters for calculating a maximum retransmission count.

Also, according to an embodiment of the disclosure, provided is a method by which a BS receives detailed information about a most recent successful random access of a UE from each of UEs so as to efficiently allocate random access channels (e.g., the number of random access channels, etc.,) to the UEs within a cell.

FIG. 1A is a diagram illustrating a configuration of an LTE system, according to some embodiments of the disclosure.

Referring to FIG. 1A, a radio access network (RAN) of the LTE system includes a plurality of eNBs (or nodes B or BSs) 1a-05, 1a-10, 1a-15, and 1a-20, a mobility management entity (MME) 1a-25, and a serving-gateway (S-GW) 1a-30. A UE (or a terminal) 1a-35 may access an external network via the eNB 1a-05, 1a-10, 1a-15, or 1a-20 and the S-GW 1a-30.

In FIG. 1A, the eNB 1a-05, 1a-10, 1a-15, or 1a-20 may correspond to an existing node B of a universal mobile telecommunications system (UMTS). The eNB may be connected to the UE 1a-35 through wireless channels and may perform complex functions compared to the existing node B. All user traffic data including real-time services such as voice over Internet protocol (VoIP) may be serviced through shared channels in the LTE system, and thus an entity for collating status information, e.g., buffer status information, available transmission power status information, and channel state information, of UEs and performing scheduling may be required and the eNB 1a-05, 1a-10, 1a-15, or 1a-20 may operate as such an entity. One eNB generally controls a plurality of cells. For example, the LTE system may use radio access technology such as OFDM at a bandwidth of 20 MHz to achieve a data rate of 100 Mbps. Furthermore, the eNB may also use adaptive modulation & coding (AMC) to determine a modulation scheme and a channel coding rate in accordance with a channel state of the UE. The S-GW 1a-30 is an entity for providing data bearers and may establish and release the data bearers by the control of the MME 1a-25. The MME is an entity for performing a mobility management function and various control functions on the UE and is connected to the plurality of eNBs.

Figure 1B:
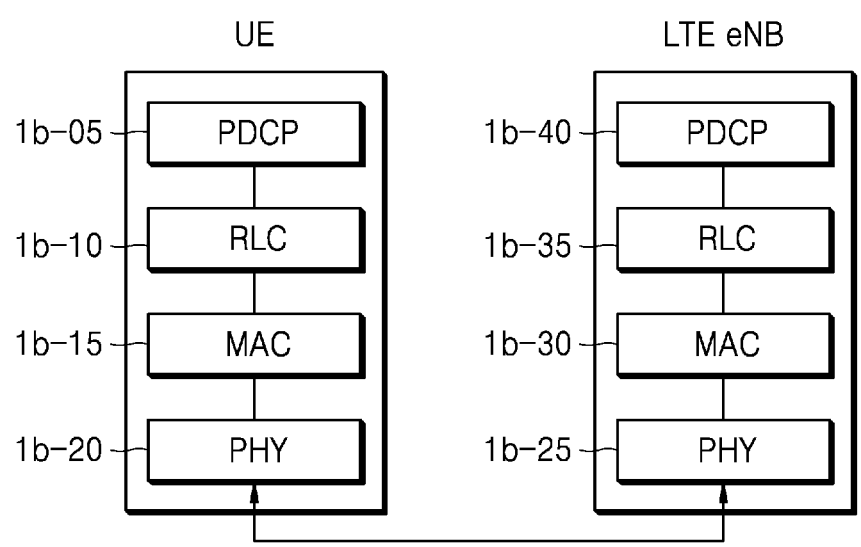
FIG. 1B is a diagram illustrating a radio protocol architecture of an LTE system, according to some embodiments of the disclosure.

FIG. 1B is a diagram illustrating a radio protocol architecture of an LTE system, according to some embodiments of the disclosure.

Referring to FIG. 1B, radio protocols of the LTE system may include Packet Data Convergence Protocol (PDCP) entities 1b-05 and 1b-40, RLC entities 1b-10 and 1b-35, and Medium Access Control (MAC) entities 1b-15 and 1b-30 respectively in a UE and an eNB. The PDCP entity 1b-05 or 1b-40 may perform, for example, IP header compression/decompression. Main functions of the PDCP entity 1b-05 or 1b-40 are summarized as shown below. However, the functions thereof are not limited thereto.

- Header compression and decompression: robust header compression (ROHC) only
- Transfer of user data
- In-sequence delivery of upper layer packet data units (PDUs) at PDCP re-establishment procedure for RLC acknowledged mode (AM)
- For split bearers in DC (only support for RLC AM): PDCP PDU routing for transmission and PDCP PDU reordering for reception
- Duplicate detection of lower layer service data units (SDUs) at PDCP re-establishment procedure for RLC AM
- Retransmission of PDCP SDUs at handover and, for split bearers in DC, of PDCP PDUs at PDCP data-recovery procedure, for RLC AM
- Ciphering and deciphering
- Timer-based SDU discard in uplink According to some embodiments, the RLC entity 1b-10 or 1b-35 may perform an automatic repeat request (ARQ) operation by reconfiguring Packet Data Convergence Protocol Packet Data Units (PDCP PDUs) to appropriate sizes. Main functions of the RLC entity may be summarized as shown below. However, the functions thereof are not limited thereto.

- Transfer of upper layer PDUs
- Error correction through ARQ (only for AM data transfer)
- Concatenation, segmentation and reassembly of RLC SDUs (only for unacknowledged mode (UM) and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment According to some embodiments, the MAC entity 1b-15 or 1b-30 may be connected to a plurality of RLC entities configured for one UE and may multiplex RLC PDUs into a MAC PDU and may demultiplex the RLC PDUs from the MAC PDU. Main functions of the MAC entity may be summarized as shown below. However, the functions thereof are not limited thereto.

- Mapping between logical channels and transport channels
- Multiplexing/demultiplexing of MAC SDUs belonging to one or different logical channels into/from transport blocks (TBs) delivered to/from the physical layer on transport channels
- Scheduling information reporting
- Error correction through hybrid ARQ (HARM)
- Priority handling between logical channels of one UE
- Priority handling between UEs by means of dynamic scheduling
- Multimedia broadcast/multicast service (MBMS) service identification
- Transport format selection
- Padding According to some embodiments, a PHY entity 1b-20 or 1b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer. However, the functions thereof are not limited thereto.

Figure 1C:
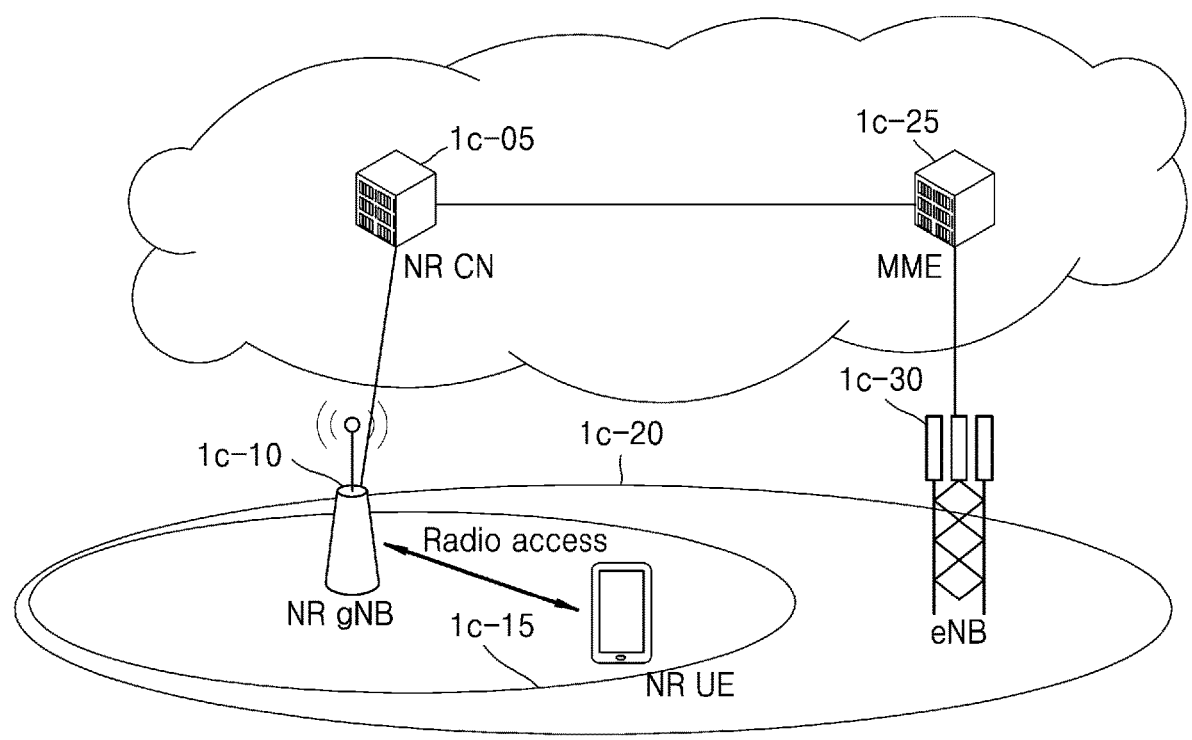
FIG. 1C is a diagram illustrating an architecture of a next-generation mobile communication system, according to some embodiments of the disclosure.

FIG. 1C is a diagram illustrating an applicable architecture of a next-generation mobile communication system, according to some embodiments of the disclosure.

Referring to FIG. 1C, as illustrated, a radio access network of the next-generation mobile communication system (hereinafter, referred to as the NR or 5G communication system) includes a new radio node B (NR gNB, NR NB, or gNB) 1c-10 and a new radio core network (NR CN) 1c-05. A NR UE (or terminal) 1c-15 may access an external network via the NR gNB 1c-10 and the NR CN 1c-05.

In FIG. 1C, the NR gNB 1c-10 may correspond to an existing eNB of the LTE system. The NR gNB 1c-10 may be connected to the NR UE 1c-15 through radio channels and may provide superior services compared to an existing node B. All user traffic data may be serviced through shared channels in the NR or 5G mobile communication system, and thus, an entity for collating buffer status information of UEs, available transmission power status information, and channel state information and performing scheduling may be required and the NR gNB 1c-10 may operate as such an entity. One NR gNB may generally control a plurality of cells. The next-generation mobile communication system may have a bandwidth greater than the maximum bandwidth of the existing LTE system so as to achieve an ultra-high data rate, compared to the existing LTE system, and may use OFDM as a radio access technology and may additionally use a beamforming technology.

Also, according to some embodiments, AMC may be used to determine a modulation scheme and a channel coding rate in accordance with a channel state of the UE. The NR CN 1c-05 may perform functions such as mobility support, bearer configuration, and quality of service (QoS) configuration. The NR CN 1c-05 is an entity for performing a mobility management function and various control functions on the NR UE 1c-15 and may be connected to a plurality of base stations. The next-generation mobile communication system may cooperate with the existing LTE system, and the NR CN 1c-05 may be connected to an MME 1c-25 through a network interface. The MME 1c-25 may be connected to an eNB 1c-30 that is an existing BS.

Figure 1D:
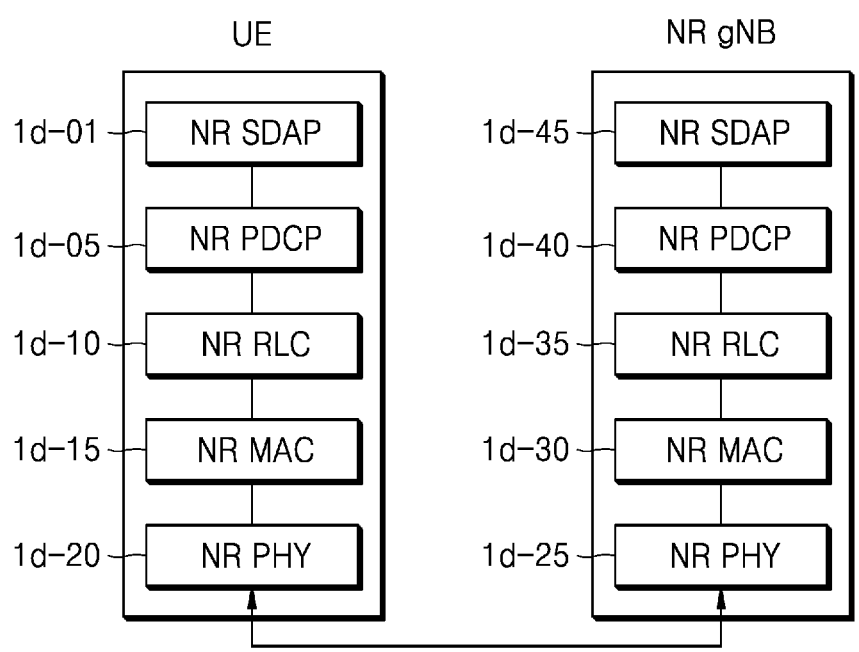
FIG. 1D is a diagram illustrating a radio protocol architecture of a next-generation mobile communication system, according to an embodiment of the disclosure.

FIG. 1D is a diagram illustrating a radio protocol architecture of a next-generation mobile communication system, according to an embodiment of the disclosure.

Referring to FIG. 1D, the radio protocol architecture of the next-generation mobile communication system may include NR Service Data Adaptation Protocol (SDAP) entities 1d-01 and 1d-45, NR PDCP entities 1d-05 and 1d-40, NR RLC entities 1d-10 and 1d-35, and NR MAC entities 1d-15 and 1d-30 respectively for a UE and an NR gNB.

Main functions of the NR SDAP entity 1d-01 or 1d-45 may include some of the following functions. However, the functions thereof are not limited thereto.

Transfer of user plane data
    Mapping between a QoS flow and a DRB for both DL and UL
    Marking QoS flow identifier (ID) in both DL and UL packets
    Reflective QoS flow to DRB mapping for the UL SDAP PDUs With regard to a SDAP entity, information about whether to use a header of the SDAP entity or to use functions of the SDAP entity may be configured for the UE by using a RRC message per PDCP entity, per bearer, or per logical channel. Also, when the SDAP header of the SDAP entity is configured, a 1-bit non access stratum (NAS) reflective QoS indicator and a 1-bit access stratum (AS) reflective QoS indicator of the SDAP header may indicate the UE to update or reconfigure UL and DL QoS flow and data bearer mapping information. According to some embodiments, the SDAP header may include QoS flow ID information indicating QoS. Furthermore, according to some embodiments, QoS information may be used as data processing priority information or scheduling information for appropriately supporting a service.

According to some embodiments, main functions of the NR PDCP entity 1d-05 or 1d-40 may include some of the following functions. However, the functions thereof are not limited thereto.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink According to some embodiments, the reordering function of the NR PDCP entity may include at least one of a function of reordering PDCP PDUs received from a lower layer, on a PDCP sequence number (SN) basis, and a function of delivering the reordered data to an upper layer in order. Alternatively, the reordering function of the NR PDCP entity may include at least one of a function of delivering the reordered data to an upper layer out of order, a function of recording missing PDCP PDUs by reordering the received PDCP PDUs, a function of reporting status information of the missing PDCP PDUs to a transmitter, and a function of requesting to retransmit the missing PDCP PDUs.

According to some embodiments, main functions of the NR RLC entity 1d-10 or 1d-35 may include some of the following functions. However, the functions thereof are not limited thereto.

Transfer of upper layer PDUs
    In-sequence delivery of upper layer PDUs
    Out-of-sequence delivery of upper layer PDUs
    Error correction through ARQ
    Concatenation, segmentation and reassembly of RLC SDUs
    Re-segmentation of RLC data PDUs
    Reordering of RLC data PDUs
    Duplicate detection
    Protocol error detection
    RLC SDU discard
    RLC re-establishment According to some embodiments, the in-sequence delivery function of the NR RLC entity indicates a function of delivering RLC SDUs received from a lower layer to an upper layer in order. The in-sequence delivery function of the NR RLC entity may include at least one of a function of reassembling the RLC SDUs and delivering the reassembled RLC SDU when a plurality of RLC SDUs segmented from one RLC SDU are received, a function of reordering received RLC PDUs on an RLC SN or PDCP SN basis, a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, or a function of delivering all RLC SDUs received before a timer starts, to an upper layer in order although a missing RLC SDU exists when a certain timer expires. Furthermore, the out-of-sequence delivery function of the NR RLC entity may process the RLC PDUs in order of reception and deliver the RLC PDUs to the NR PDCP entity regardless of SNs (out-of-sequence delivery), and when a received RLC PDU is a segment, the NR RLC entity may reassemble the segment with other segments stored in a buffer or subsequently received, into a whole RLC PDU and may transmit the RLC PDU to the NR PDCP entity. According to some embodiments, the NR RLC entity may not have a concatenation function, and the function may be performed by the NR MAC entity or be replaced with a multiplexing function of the NR MAC entity.

The out-of-sequence delivery function of the NR RLC may include at least one of a function of directly delivering RLC SDUs received from a lower layer to an upper layer out of order, a function of reassembling a plurality of RLC SDUs segmented from one RLC SDU and delivering the reassembled RLC SDU when the segmented RLC SDUs are received, and a function of recording missing RLC PDUs by storing RLC SNs or PDCP SNs of received RLC PDUs and reordering the received RLC PDUs.

According to some embodiments, the NR MAC entity 1d-15 or 1d-30 may be connected to a plurality of NR RLC entities configured for one UE, and main functions of the NR MAC entity may include some of the following functions. However, the functions thereof are not limited thereto.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding According to some embodiments, an NR PHY entity 1d-20 or 1d-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer. However, the functions thereof are not limited thereto.

Figure 1E:
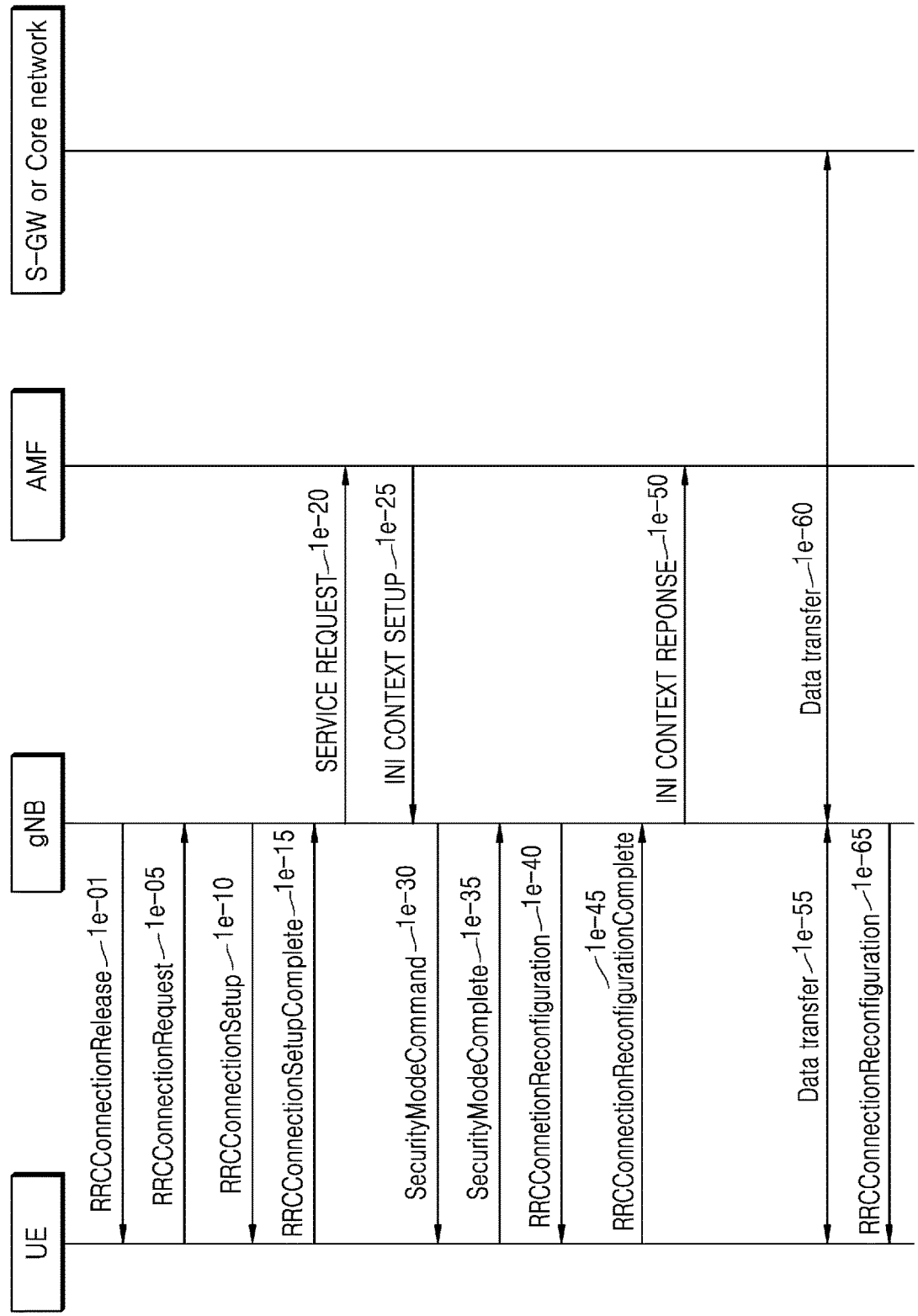
FIG. 1E is a diagram illustrating a procedure in which a user equipment (UE) performs Radio Resource Control (RRC) connection configuration with a base station (BS) when the UE configures connection to a network in a wireless communication system, according to some embodiments of the disclosure.

FIG. 1E is a diagram illustrating a procedure in which a UE performs RRC connection configuration with a BS when the UE configures connection to a network in a next-generation mobile communication system, according to some embodiments of the disclosure.

Referring to FIG. 1E, when the UE configured to transmit or receive data in an RRC connected mode does not transmit or receive data due to a preset reason or during a preset time period, the BS may transmit a RRCConnectionRelease message to the UE so as to indicate the UE to switch to an RRC idle mode (operation 1e-01). Afterward, when the UE that is not currently connected (hereinafter, the idle mode UE) has data to transmit, the UE may perform an RRC connection establishment procedure with the BS.

The UE establishes inverse direction transmission synchronization with the BS via a random access procedure, and transmits an RRCConnectionRequest message to the BS (operation 1e-05). The RRCConnectionRequest message may include an identifier of the UE, an establishment cause, or the like.

The BS transmits an RRCConnectionSetup message to indicate the UE to establish RRC connection (operation 1e-10). The RRCConnectionSetup message may include at least one of configuration information of each logical channel, configuration information of each bearer, PDCP entity configuration information, RLC entity configuration information, and MAC entity configuration information.

Also, the BS may configure dual connectivity and carrier aggregation to the UE by configuring, in the RRCConnectionSetup message, the PDCP entity configuration information, a bearer identifier, a logical channel identifier, information of mapping between a logical channel and a cell (frequency), cell group configuration information, or a threshold value to be used in the dual connectivity.

Furthermore, according to some embodiments, in order to configure the UE with UL or DL packet duplication transmission in the RRCConnectionSetup message, two RLC entities may be configured in the PDCP entity configuration information, and a primary RLC entity and a secondary RLC entity may be indicated by using logical channel identifiers or indicators. In the descriptions above, packet duplication transmission may be used in both the dual connectivity and the carrier aggregation.

Furthermore, according to some embodiments, the RRCConnectionSetup message may configure an initial state of a bearer (e.g., a Signaling Radio Bearer (SRB) or a Data Radio Bearer (DRB)) configured with the packet duplication transmission to an active state or an inactive state. Also, a mapping relation between respective RLC entities and cells may be configured in the RRCConnectionSetup message. For example, the RRCConnectionSetup message may configure the primary RLC entity to be connected or mapped to a primary cell (Pcell), and configure the secondary RLC entity to be connected or mapped to a Secondary cell 1 (Scell 1) or Scell 2.

According to some embodiments, an RLC entity for which mapping with a cell is configured may transmit data only to the mapped cell. Also, in the RRCConnectionSetup message, information of mapping between QoS flows and bearers may be configured through the SDAP entity configuration information or the PDCP entity configuration information, and the SDAP entity may transmit data to the PDCP entity configured due to mapping, the data being received from an upper layer by using the mapping information. Furthermore, the RRCConnectionSetup message may indicate a retransmission count that is maximally allowed in an RLC entity operating in an Acknowledged Mode (AM). Also, the RRCConnectionSetup message may include RRC connection configuration information, or the like. RRC connection refers to an SRB, and may be used in transmission or reception of an RRC message that is a control message between the UE and the BS.

The UE that set up the RRC connection transmits an RRCConnetionSetupComplete message to the BS (operation 1e-15). The RRCConnetionSetupComplete message may include a control message of SERVICE REQUEST requesting, by the UE, an Access and Mobility Function (AMF) or an MME for a bearer configuration for a preset service. The BS may transmit the SERVICE REQUEST message included in the RRCConnetionSetupComplete message to the AMF or the MME (operation 1e-20). The AMF or the MME may determine whether to provide the service requested by the UE.

As a result of the determination, when the AMF or the MME determines to provide the service requested by the UE, the AMF or the MME transmits an INITIAL CONTEXT SETUP REQUEST message to the BS (operation 1e-25). The INITIAL CONTEXT SETUP REQUEST message may include QoS information to be applied to a configuration of a DRB, security information (e.g., a security key, a security algorithm, or the like) to be applied to the DRB, or the like.

The BS transmits and receives a SecurityModeCommand message (operation 1e-30) and a SecurityModeComplete message (operation 1e-35) to and from the UE so as to configure security. When the configuration of the security is completed, the BS transmits an RRCConnectionReconfiguration message to the UE (operation 1e-40).

The RRCConnectionReconfiguration message may include at least one of configuration information of each logical channel, configuration information of each bearer, PDCP entity configuration information, RLC entity configuration information, and MAC entity configuration information. Also, the BS may configure dual connectivity and carrier aggregation to the UE by configuring, in the RRCConnectionReconfiguration message, the PDCP entity configuration information, a bearer identifier, a logical channel identifier, information of mapping between a logical channel and a cell (frequency), cell group configuration information, or a threshold value to be used in the dual connectivity.

Furthermore, in order to configure the UE with UL or DL packet duplication transmission in the RRCConnectionReconfiguration message, two RLC entities may be configured in the PDCP entity configuration information, and a primary RLC entity and a secondary RLC entity may be indicated by using logical channel identifiers or indicators.

According to some embodiments, packet duplication transmission may be used in both the dual connectivity and the carrier aggregation. Furthermore, the RRCConnectionReconfiguration message may configure an initial state of a bearer (e.g., a SRB or a DRB) configured with the packet duplication transmission to an active state or an inactive state. Also, a mapping relation between respective RLC entities and cells may be configured in the RRCConnectionReconfiguration message, and for example, the RRCConnectionReconfiguration message may configure the primary RLC entity to be connected or mapped to a primary cell (Pcell), and configure the secondary RLC entity to be connected or mapped to a Secondary cell 1 (Scell 1) or Scell 2 According to some embodiments, an RLC entity for which mapping with a cell is configured may transmit data only to the mapped cell.

Also, in the RRCConnectionReconfiguration message, information of mapping between QoS flows and bearers may be configured through the SDAP entity configuration information or the PDCP entity configuration information, and the SDAP entity may transmit data to the PDCP entity configured due to mapping, the data being received from an upper layer by using the mapping information. Furthermore, the RRCConnectionReconfiguration message may indicate a retransmission count that is maximally allowed in an RLC entity operating in an AM. The RRCConnectionReconfiguration message may include configuration information about a DRB in which user data is to be processed, and the UE may configure the DRB by using the information and may transmit an RRCConnectionReconfigurationComplete message to the BS (operation 1e-45). After the BS completes the configuration of the DRB for the UE, the BS may transmit an INITIAL CONTEXT SETUP COMPLETE message to the AMF or the MME and may complete connection (operation 1e-50).

When the procedure is completed, the UE transmits or receives data to or from the BS via a core network (operations 1e-55 and 1e-60). According to some embodiments, a data transmission procedure is broadly composed of three operations that are RRC connection setup, security configuration, and DRB configuration. Also, the BS may transmit an RRC Connection Reconfiguration message to newly perform or add configuration for the UE due to preset reasons (operation 1e-65). The RRCConnectionReconfiguration message may include at least one of configuration information of each logical channel, configuration information of each bearer, PDCP entity configuration information, RLC entity configuration information, and MAC entity configuration information. Also, the BS may configure dual connectivity and carrier aggregation to the UE by configuring, in the RRCConnectionReconfiguration message, the PDCP entity configuration information, a bearer identifier, a logical channel identifier, information of mapping between a logical channel and a cell (frequency), cell group configuration information, or a threshold value to be used in the dual connectivity. Furthermore, in order to configure the UE with UL or DL packet duplication transmission in the RRCConnectionReconfiguration message, two RLC entities may be configured in the PDCP entity configuration information, and a primary RLC entity and a secondary RLC entity may be indicated by using logical channel identifiers or indicators. According to some embodiments, packet duplication transmission may be used in both the dual connectivity and the carrier aggregation.

Furthermore, the RRCConnectionReconfiguration message may configure an initial state of a bearer (e.g., a SRB or a DRB) configured with the packet duplication transmission to an active state or an inactive state. Also, a mapping relation between respective RLC entities and cells may be configured in the RRCConnectionReconfiguration message, and for example, the RRCConnectionReconfiguration message may configure the primary RLC entity to be connected or mapped to a primary cell (Pcell), and configure the secondary RLC entity to be connected or mapped to a Secondary cell 1 (Scell 1) or Scell 2 According to some embodiments, an RLC entity for which mapping with a cell is configured may transmit data only to the mapped cell. However, the disclosure is not limited thereto. Also, in the RRCConnectionReconfiguration message, information of mapping between QoS flows and bearers may be configured through the SDAP entity configuration information or the PDCP entity configuration information, and the SDAP entity may transmit data to the PDCP entity configured due to mapping, the data being received from an upper layer by using the mapping information. Furthermore, the RRCConnectionReconfiguration message may indicate a retransmission count that is maximally allowed in an RLC entity operating in an AM.

Figure 1F:
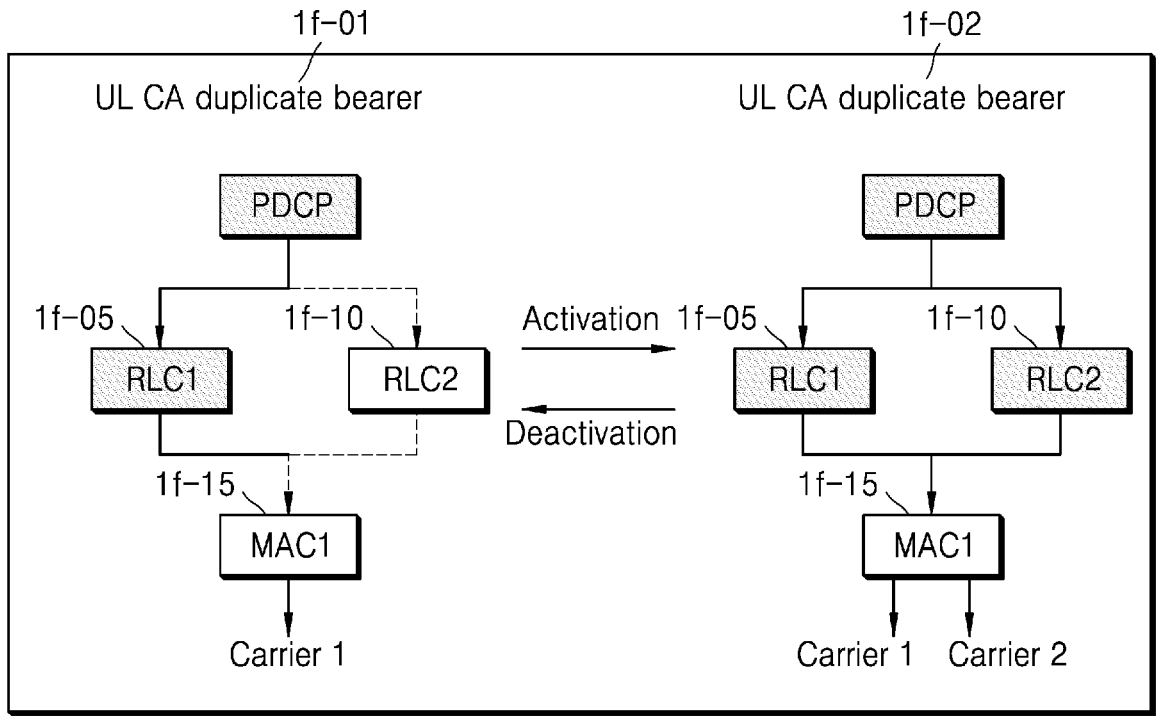
FIG. 1F is a diagram illustrating a procedure in which packet duplication transmission is configured and is performed in an active state and an inactive state in a next-generation mobile communication system, according to some embodiments of the disclosure.
Figure 1F:
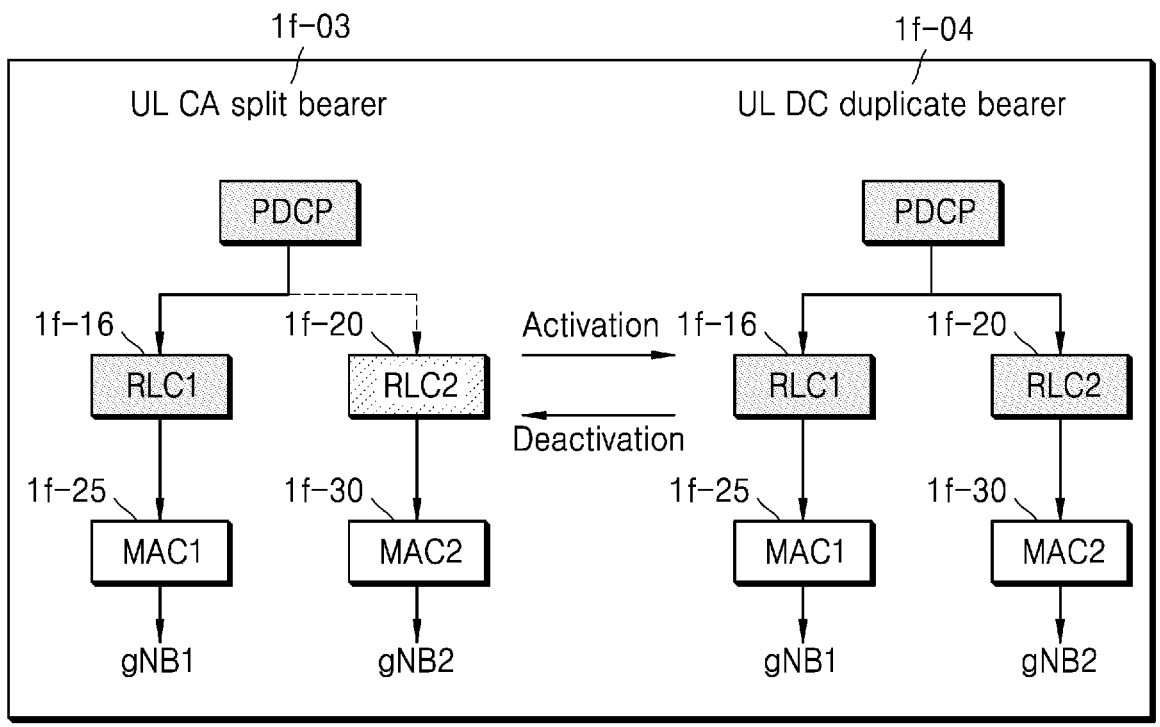

FIG. 1F is a diagram illustrating a procedure in which packet duplication transmission is configured and is performed in an active state and an inactive state in a next-generation mobile communication system, according to some embodiments of the disclosure.

According to some embodiments, when the UE receives configuration of the packet duplication transmission from the BS through an RRC message as described with reference to FIG. 1E, the UE may configure the packet duplication transmission. When the packet duplication transmission configured through the RRC message is configured in Carrier Aggregation (CA), the UE may configure two RLC entities, i.e., a primary RLC entity 1f-16 and a secondary RLC entity 1f-10, for a bearer or a PDCP entity to which the packet duplication transmission is configured. In a case where the packet duplication transmission is inactivated, when the PDCP entity transmits a packet to a lower RLC entity in UL transmission, the PDCP entity transmits the packet only to a primary RLC entity and does not transmit the packet to a secondary RLC entity. In a case where the packet duplication transmission is activated, in UL transmission, the PDCP entity may duplicately transmit a same packet to each of two lower RLC entities (the primary RLC entity and the secondary RLC entity). That is, the PDCP entity may transmit a packet to the primary RLC entity, and may duplicate the packet and thus may transmit the same packet to the secondary RLC entity.

When the packet duplication transmission is configured and activated in the CA, a MAC entity 1f-15 may load data received from the primary RLC entity and data received from the secondary RLC entity onto different carriers and may transmit them, the primary RLC entity and the secondary RLC entity having different logical channel identifiers. The aforementioned procedure is about transmission of UL data, and when DL data is received, the UE has to always receive the DL data to which the packet duplication transmission is applied. That is, even when the packet duplication transmission is inactivated with respect to a UL and thus the UE cannot duplicately transmit UL data to the secondary RLC entity, the secondary RLC entity 1f-10 has to receive DL data from the MAC entity, to process the DL data, and thus to transmit the DL data to the PDCP entity.

That is, when the packet duplication transmission is configured and activated in the CA, the PDCP entity of the UE may duplicately transmit UL data to the primary RLC entity and the secondary RLC entity, and when the packet duplication transmission is configured and inactivated in the CA, the PDCP entity of the UE does not perform a duplication procedure on UL data and may transmit the UL data only to the primary RLC entity. Configuration of activation and inactivation of the packet duplication transmission may also be determined by a MAC control element.

When the packet duplication transmission configured through the RRC message is configured in Dual Connectivity (DC), the UE may configure two RLC entities, i.e., a primary RLC entity 1*f*-16 and a secondary RLC entity 1*f*-20, for a bearer or a PDCP entity to which the packet duplication transmission is configured. In a case where the packet duplication transmission is inactivated, when the PDCP entity transmits a packet to a lower RLC entity in UL transmission, the PDCP entity transmits the packet to a primary RLC entity and a secondary RLC entity but does not duplicately process data as in operations of a split bearer and may transmit a plurality of pieces of different data to the primary RLC entity and the secondary RLC entity, respectively. In a case where the packet duplication transmission is activated, in UL transmission, the PDCP entity may duplicately transmit a same packet to each of two lower RLC entities (the primary RLC entity and the secondary RLC entity). That is, the PDCP entity may transmit a packet to the primary RLC entity, and may duplicate the packet and thus may transmit the same packet to the secondary RLC entity.

When the packet duplication transmission is configured and activated in the DC, MAC entities 1*f*-25 and 1*f*-30 may respectively load data received from the primary RLC entity and data received from the secondary RLC entity onto different transport resources and may transmit them to different BSs. The aforementioned procedure is about transmission of UL data, and when DL data is received, the UE has to always receive the DL data to which the packet duplication transmission is applied.

That is, when the packet duplication transmission is configured and activated in the DA, the PDCP entity of the UE may duplicately transmit UL data to the primary RLC entity and the secondary RLC entity, and when the packet duplication transmission is configured and inactivated in the CA, the PDCP entity of the UE does not perform a duplication procedure on UL data and may transmit, as a split bearer, different data to the primary RLC entity and the secondary RLC entity. Configuration of activation and inactivation of the packet duplication transmission may also be determined by a MAC control element.

Hereinafter, provided is a method of efficiently managing a case where a maximum retransmission count for preset data exceeds in two RLC entities configured with the packet duplication transmission.

When the maximum retransmission count for the preset data exceeds in an RLC entity that is connected to a primary cell (Pcell) from among the two RLC entities, the UE may trigger an RLF and may report occurrence of the RLF to the BS by using an RRC message. Then, the RLC entity discontinues transmission. All of a PDCP entity, an RLC entity, and a MAC entity may discontinue transmission, and may reconfigure RRC connection.

However, when a maximum retransmission count for preset data exceeds in an RLC entity that is not connected to a primary cell (Pcell) but is connected to a secondary cell (Scell) from among the two RLC entities, the UE may trigger a Scell RLF and may report, by using an RRC message, that the maximum retransmission count for preset data exceeds in the RLC entity connected to Scells. In order to indicate the RLC entity triggered the Scell RLF, the RRC message may include a logical channel identifier, a bearer identifier, and an indicator indicating a master cell group (MCG) or a secondary cell group (SCG). For example, when a value of a 1-bit indicator is 0, the indicator may indicate the MCG, and when the value is 1, the indicator may indicate the SCG. When the Scell RLF is triggered, the RLC entity, the PDCP entity, another RLC entity, and the MAC entity of the UE may continue transmitting data. Then, the UE may perform a necessary procedure, based on a response from the BS with respect to the report on the Scell RLF.

For example, mapping between the RLC entity and a new cell (Pcell or Scell) may be configured. The reason why the UE continues data transmission even when the Scell RLF is triggered is because significant transmission delay may occur if RRC connection is reconfigured due to declaration of RLF, and because connection to Pcell is smooth, the UE may solve the Scell RLF while the UE maintains data transmission. Furthermore, reception of DL data is not affected only when the RLC entity that triggered the Scell RLF still can transmit data. It is because DL data can be continuously transmitted only when an RLC status report on a DL is continuously transmitted.

According to some embodiments, the Pcell may refer to a cell configured to have a physical uplink control channel (PUCCH) transport resource, to perform frequency measurement reporting, and to transmit or receive a control message with the BS, and the Scell may refer to a cell mainly configured to transmit data. However, the disclosure is not limited thereto.

Also, embodiments of the disclosure may be equally applied to a case in which a normal RLC entity that is not configured with the packet duplication transmission is not connected to the Pcell but is associated with or mapped to only Scells.

Hereinafter, provided is Embodiment 1 in which an RLC entity operating in an AM calculates whether a maximum retransmission count for data to be retransmitted exceeds, and when the maximum retransmission count exceeds, the excess is reported to its upper entity (e.g., an RRC entity).

The maximum retransmission count may be configured in at least one of messages of operations 1*e*-10, 1*e*-40, or 1*e*-65 as described with reference to FIG. 1E, and may be indicated as a maxRetxThreshold value.

In Embodiment 1, a variable of RETX_COUNT may be defined and operated for each data (e.g., for each RLC SDU or RLC PDU) so as to record and store a retransmission count for each data. Whenever retransmission for each data is performed, the variable of RETX_COUNT may be managed by being increased by 1 and stored.

A detailed procedure proposed in Embodiment 1 will now be described below.

When an RLC entity operating in an AM considers retransmission of data (e.g., an RLC SDU) or segmented data (e.g., a RLC SDU segment), the RLC entity performs a procedure below.

1. When the RLC entity first performs or considers retransmission of the data (the RLC SDU) or the segmented data (the RLC SDU segment), A. the RLC entity configures a RETX_COUNT value of the data to be 0.

2. Otherwise, that is, in a case where the RLC entity does not first perform or consider retransmission of the data (the RLC SDU) or the segmented data (the RLC SDU segment), when retransmission is not stood by (reserved) with respect to the data (the RLC SDU) or the segmented data (the RLC SDU segment), and an increase due to another NACK of a same RLC status PDU did not occur in a RETX_COUNT value of the same data, A. the RETX_COUNT value is increased by 1.

3. When the RETX_COUNT value for the data is equal to a maximum retransmission count (maxRetxThreshold), A. the RLC entity reports that a retransmission count has reached the maximum retransmission count to its upper entity (e.g., an RRC entity).

An example of the procedure is provided below.

Example 1

When an RLC SDU or an RLC SDU segment is considered for retransmission, the transmitting side of the AM RLC entity shall:
if the RLC SDU or RLC SDU segment is considered for retransmission for the first time:
set the RETX_COUNT associated with the RLC SDU to zero.
else, if it (the RLC SDU or the RLC SDU segment that is considered for retransmission) is not pending for retransmission already and the RETX_COUNT associated with the RLC SDU has not been incremented due to another negative acknowledgment in the same STATUS PDU:
increment the RETX_COUNT.
if RETX_COUNT=maxRetxThreshold:
indicate to upper layers that max retransmission has been reached In the procedure above, when the RLC entity operating in the AM reports, to its upper entity (e.g., the RRC entity), that the maximum retransmission count has been reached, the upper entity may configure and transmit an RRC message to the BS so as to report an RLF when the RLC entity is connected to the Pcell. Then, each of entities (e.g., a PDCP entity, the RLC entity, or an MAC entity) may discontinue data transmission. When the RLC entity is not connected to the Pcell but is connected only to Scells, the upper entity may configure and transmit an RRC message to the BS so as to report a Scell RLF. Then, each of the entities (e.g., the PDCP entity, the RLC entity, or the MAC entity) may continue data transmission.

In the procedure above, when a retransmission count for preset data reaches a maximum retransmission count, the RLC entity is configured to report to its upper entity, and when the RLC entity is connected to the Pcell, the upper entity may trigger an RLF and may indicate each of the entities to discontinue transmission. However, when the RLC entity is not connected to the Pcell but is connected only to the Scells, the upper entity may trigger a Scell RLF and may not perform particular indication on each of the entities, thereby allowing the entities to continue data transmission. Therefore, in a case where the Scell RLF is triggered, transmission and retransmission of data are continued in the RLC entity, and thus, a retransmission count for another data except for the data for which the maximum retransmission count has been reached may reach a maximum retransmission count. Accordingly, the RLC entity may report, to its upper entity (e.g., the RRC entity), that the retransmission count for the other data has reached the maximum retransmission count. Therefore, a Scell RLF may be reported a plurality of times.

Thus, even when the upper entity (e.g., the RRC entity) receives a plurality of times an indication indicating that a retransmission count has reached a maximum retransmission count from one RLC entity, the upper entity may perform a procedure of configuring an RRC message and reporting a Scell RLF to the BS only one time. After the RRC entity reports the Scell RLF, when a response thereto is not received from the BS in a preset time period, the RRC entity may re-transmit a Scell RLF. That is, in a case where a response to the Scell RLF is not received until a timer runs and then expires, when the timer expires, the RRC entity may re-perform reporting by re-transmitting the RRC message about the Scell RLF to the BS.

Furthermore, according to some embodiments, the upper entity may define and run a Scell-RLF reporting-prohibit timer, and, while the Scell-RLF reporting-prohibit timer is running, even when the upper entity receives an indication indicating that a retransmission count has reached a maximum retransmission count from the RLC entity, the upper entity does not report a Scell RLF, and after a timer expires, the upper entity may report the Scell RLF, or when the indication indicating that a retransmission count has reached a maximum retransmission count is received after the Scell-RLF reporting-prohibit timer expires, the upper entity may report the Scell RLF.

Hereinafter, provided is Embodiment 2 in which the RLC entity operating in an AM calculates whether a maximum retransmission count for data to be retransmitted exceeds, and when the maximum retransmission count exceeds, the excess is reported to its upper entity (e.g., the RRC entity).

The maximum retransmission count may be configured in at least one of messages of operations 1e-10, 1e-40, or 1e-65 as described with reference to FIG. 1E, and may be indicated as a maxRetxThreshold value.

In Embodiment 2, a variable of RETX_COUNT may be defined and operated for each data (e.g., for each RLC SDU or RLC PDU) so as to record and store a retransmission count for each data. Whenever retransmission for each data is performed, the variable of RETX_COUNT may be managed by being increased by 1 and stored.

A detailed procedure proposed in Embodiment 2 will now be described below.

When the RLC entity operating in an AM considers retransmission of data (e.g., an RLC SDU) or segmented data (e.g., a RLC SDU segment), the RLC entity performs a procedure below.

1. When the RLC entity first performs or considers retransmission of the data (the RLC SDU) or the segmented data (the RLC SDU segment), A. the RLC entity configures a RETX_COUNT value of the data to be 0.

2. Otherwise, that is, in a case where the RLC entity does not first perform or consider retransmission of the data (the RLC SDU) or the segmented data (the RLC SDU segment), when retransmission is not stood by with respect to the data (the RLC SDU) or the segmented data (the RLC SDU segment), and an increase due to another NACK of a same RLC status PDU did not occur in a RETX_COUNT value of the same data, A. the RETX_COUNT value is increased by 1.

3. When the RETX_COUNT value for the data is equal to a maximum retransmission count (maxRetxThreshold), A. the RLC entity reports that a retransmission count has reached the maximum retransmission count to its upper entity (e.g., the RRC entity).

B. Then, the RLC entity does not consider retransmission of the data (the RLC SDU) or the segmented data (the RLC SDU segment).

An example of the procedure is provided below.

Example 1

When an RLC SDU or an RLC SDU segment is considered for retransmission, the transmitting side of the AM RLC entity shall:
  if the RLC SDU or RLC SDU segment is considered for retransmission for the first time:
    set the RETX_COUNT associated with the RLC SDU to zero.
  else, if it (the RLC SDU or the RLC SDU segment that is considered for retransmission) is not pending for retransmission already and the RETX_COUNT associated with the RLC SDU has not been incremented due to another negative acknowledgment in the same STATUS PDU:
    increment the RETX_COUNT.
  if RETX_COUNT=maxRetxThreshold:
    indicate to upper layers that max retransmission has been reached
    do not consider any RLC SDU or RLC SDU segment for retransmission.

In the procedure above, when the RLC entity operating in the AM reports, to its upper entity (e.g., the RRC entity), that the maximum retransmission count has been reached, the upper entity may configure and transmit an RRC message to the BS so as to report an RLF when the RLC entity is connected to the Pcell. Then, each of entities (e.g., a PDCP entity, the RLC entity, or an MAC entity) may discontinue data transmission. When the RLC entity is not connected to the Pcell but is connected only to Scells, the upper entity may configure and transmit an RRC message to the BS so as to report a Scell RLF. Then, each of the entities (e.g., the PDCP entity, the RLC entity, or the MAC entity) may continue data transmission.

In the procedure above, when a retransmission count for preset data reaches a maximum retransmission count, the RLC entity is configured to report to its upper entity, and when the RLC entity is connected to the Pcell, the upper entity may trigger an RLF and may indicate each of the entities to discontinue transmission. However, when the RLC entity is not connected to the Pcell but is connected only to the Scells, the upper entity may trigger a Scell RLF and may not perform particular indication on each of the entities, thereby allowing the entities to continue data transmission.

In the procedure above, when a retransmission count for preset data reaches a maximum retransmission count, the RLC entity is configured to report to its upper entity, but the upper entity does not consider retransmission of the data (the RLC SDU) or the segmented data (the RLC SDU segment), a retransmission count is not increased for any data. Therefore, a case in which an indication indicating that a retransmission count has reached a maximum retransmission count is reported to the upper entity a plurality of times does not occur.

Furthermore, after the upper entity (e.g., the RRC entity) or the RLC entity reports the Scell RLF, when a response thereto is not received from the BS in a preset time period, the RRC entity or the RLC entity may re-transmit a Scell RLF or the indication indicating that a retransmission count has reached a maximum retransmission. That is, in a case where a response to the Scell RLF is not received until a timer runs and then expires, when the timer expires, the RRC entity may re-perform reporting by re-transmitting the RRC message about the Scell RLF to the BS. Furthermore, according to some embodiments, the RLC entity may report again the indication indicating that a retransmission count has reached a maximum retransmission to the upper entity, and thus the Scell RLF may be reported again to the BS.

Hereinafter, provided is Embodiment 3 in which the RLC entity operating in an AM calculates whether a maximum retransmission count for data to be retransmitted exceeds, and when the maximum retransmission count exceeds, the excess is reported to its upper entity (e.g., the RRC entity).

The maximum retransmission count may be configured in at least one of messages of operations 1$e$-10, 1$e$-40, or 1$e$-65 as described with reference to FIG. 1E, and may be indicated as a maxRetxThreshold value.

In Embodiment 3, a variable of RETX_COUNT may be defined and operated for each data (e.g., for each RLC SDU or RLC PDU) so as to record and store a retransmission count for each data. Whenever retransmission for each data is performed, the variable of RETX_COUNT may be managed by being increased by 1 and stored.

A detailed procedure proposed in Embodiment 3 will now be described below.

When the RLC entity operating in an AM considers retransmission of data (e.g., an RLC SDU) or segmented data (e.g., a RLC SDU segment), the RLC entity performs a procedure below.

1. When the RLC entity first performs or considers retransmission of the data (the RLC SDU) or the segmented data (the RLC SDU segment),
  A. the RLC entity configures a RETX_COUNT value of the data to be 0.

2. Otherwise, that is, in a case where the RLC entity does not first perform or consider retransmission of the data (the RLC SDU) or the segmented data (the RLC SDU segment), when retransmission is not stood by with respect to the data (the RLC SDU) or the segmented data (the RLC SDU segment), and an increase due to another NACK of a same RLC status PDU did not occur in a RETX_COUNT value of the same data,
  A. the RETX_COUNT value is increased by 1.

3. When the RETX_COUNT value for the data is equal to a maximum retransmission count (maxRetxThreshold),
  A. the RLC entity reports that a retransmission count has reached the maximum retransmission count to its upper entity (e.g., the RRC entity).
  B. Then, the RLC entity does not consider retransmission of the data (the RLC SDU) or the segmented data (the RLC SDU segment) (thus, it is possible to prevent the RETX_COUNT value for the data or the segmented data from increasing to a greater value).

An example of the procedure is provided below.

Example 1

When an RLC SDU or an RLC SDU segment is considered for retransmission, the transmitting side of the AM RLC entity shall:
  if the RLC SDU or RLC SDU segment is considered for retransmission for the first time:
    set the RETX_COUNT associated with the RLC SDU to zero.
  else, if it (the RLC SDU or the RLC SDU segment that is considered for retransmission) is not pending for retransmission already and the RETX_COUNT associated with the RLC SDU has not been incremented due to another negative acknowledgment in the same STATUS PDU:

increment the RETX_COUNT.

if RETX_COUNT=maxRetxThreshold:

indicate to upper layers that max retransmission has been reached do not consider the RLC SDU or RLC SDU segment for retransmission.

In the procedure above, when the RLC entity operating in the AM reports, to its upper entity (e.g., the RRC entity), that the maximum retransmission count has been reached, the upper entity may configure and transmit an RRC message to the BS so as to report an RLF when the RLC entity is connected to the Pcell. Then, the upper entity may discontinue data retransmission with respect to each of entities. When the RLC entity is not connected to the Pcell but is connected only to Scells, the upper entity may configure and transmit an RRC message to the BS so as to report a Scell RLF. Then, each of the entities (e.g., the PDCP entity, the RLC entity, or the MAC entity) may continue data transmission.

In the procedure above, when a retransmission count for preset data reaches a maximum retransmission count, the RLC entity is configured to report to its upper entity, and when the RLC entity is connected to the Pcell, the upper entity may trigger an RLF and may indicate each of the entities to discontinue transmission. However, when the RLC entity is not connected to the Pcell but is connected only to the Scells, the upper entity may trigger a Scell RLF and may not perform particular indication on each of the entities, thereby allowing the entities to continue data transmission. Therefore, in a case where the Scell RLF is triggered, transmission and retransmission of data are continued in the RLC entity, and thus, a retransmission count for another data except for the data for which the maximum retransmission count has been reached may reach a maximum retransmission count. Accordingly, the RLC entity may report, to its upper entity (e.g., the RRC entity), that the retransmission count for the other data has reached the maximum retransmission count. Therefore, a Scell RLF may be reported a plurality of times.

Thus, even when the upper entity (e.g., the RRC entity) receives a plurality of times an indication indicating that a retransmission count has reached a maximum retransmission count from one RLC entity, the upper entity may perform a procedure of configuring an RRC message and reporting a Scell RLF to the BS only one time. After the RRC entity reports the Scell RLF, when a response thereto is not received from the BS in a preset time period, the RRC entity may re-transmit a Scell RLF. That is, in a case where a response to the Scell RLF is not received until a timer runs and then expires, when the timer expires, the RRC entity may re-perform reporting by re-transmitting the RRC message about the Scell RLF to the BS.

Furthermore, according to some embodiments, the upper entity may define and run a Scell-RLF reporting-prohibit timer, and, while the Scell-RLF reporting-prohibit timer is running, even when the upper entity receives an indication indicating that a retransmission count has reached a maximum retransmission count from the RLC entity, the upper entity does not report a Scell RLF, and after a timer expires, the upper entity may report the Scell RLF, or when the indication indicating that a retransmission count has reached a maximum retransmission count is received after the Scell-RLF reporting-prohibit timer expires, the upper entity may report the Scell RLF.

Furthermore, according to some embodiments, the upper entity may define and run a maximum retransmission count-reached indication prohibit timer, and, while the maximum retransmission count-reached indication prohibit timer is running, even when a case where a retransmission count has reached a maximum retransmission count occurs in the RLC entity, the RLC entity does not report the indication to the upper entity, and after the maximum retransmission count-reached indication prohibit timer expires, the RLC entity may report the indication, or when a retransmission count has reached a maximum retransmission count after the maximum retransmission count-reached indication prohibit timer expires, the RLC entity may report the indication.

Hereinafter, provided is Embodiment 4 in which the RLC entity operating in an AM calculates whether a maximum retransmission count for data to be retransmitted exceeds, and when the maximum retransmission count exceeds, the excess is reported to its upper entity (e.g., the RRC entity).

In the above descriptions, the maximum retransmission count may be configured in at least one of messages of operations 1e-10, 1e-40, or 1e-65 as described with reference to FIG. 1E, and may be indicated as a maxRetxThreshold value.

In Embodiment 4, a variable of RETX_COUNT may be defined and operated for each data (e.g., for each RLC SDU or RLC PDU) so as to record and store a retransmission count for each data. Whenever retransmission for each data is performed, the variable of RETX_COUNT may be managed by being increased by 1 and stored.

A detailed procedure proposed in Embodiment 4 will now be described below.

When the RLC entity operating in an AM considers retransmission of data (e.g., an RLC SDU) or segmented data (e.g., a RLC SDU segment), the RLC entity performs a procedure below.

1. When the RLC entity first performs or considers retransmission of the data (the RLC SDU) or the segmented data (the RLC SDU segment), A. the RLC entity configures a RETX_COUNT value of the data to be 0.

2. Otherwise, that is, in a case where the RLC entity does not first perform or consider retransmission of the data (the RLC SDU) or the segmented data (the RLC SDU segment), when retransmission is not stood by with respect to the data (the RLC SDU) or the segmented data (the RLC SDU segment), and an increase due to another NACK of a same RLC status PDU did not occur in a RETX_COUNT value of the same data, A. the RETX_COUNT value is increased by 1.

3. When the RETX_COUNT value for the data is equal to a maximum retransmission count (maxRetxThreshold), A. in a case where the RLC entity (the RLC entity that retransmitted the data) has not previously reported, to the upper entity, an indication indicating that a retransmission count has reached a maximum retransmission count, the RLC entity reports the indication indicating that a retransmission count has reached a maximum retransmission count to the upper entity (e.g., the RRC entity).

B. Then, the RLC entity does not consider retransmission of the data (the RLC SDU) or the segmented data (the RLC SDU segment) (thus, it is possible to prevent the RETX_COUNT value for the data or the segmented data from increasing to a greater value).

An example of the procedure is provided below.

Example 1

When an RLC SDU or an RLC SDU segment is considered for retransmission, the transmitting side of the AM RLC entity shall:

if the RLC SDU or RLC SDU segment is considered for retransmission for the first time:
  set the RETX_COUNT associated with the RLC SDU to zero.
else, if it (the RLC SDU or the RLC SDU segment that is considered for retransmission) is not pending for retransmission already and the RETX_COUNT associated with the RLC SDU has not been incremented due to another negative acknowledgment in the same STATUS PDU:
  increment the RETX_COUNT.
  if RETX_COUNT=maxRetxThreshold:
  indicate to upper layers that max retransmission has been reached if it has not been indicated before.
  do not consider the RLC SDU or RLC SDU segment for retransmission.

In the procedure above, when the RLC entity operating in the AM reports, to its upper entity (e.g., the RRC entity), that the maximum retransmission count has been reached, the upper entity may configure and transmit an RRC message to the BS so as to report an RLF when the RLC entity is connected to the Pcell. Then, each of entities (e.g., the PDCP entity, the RLC entity, or the MAC entity) may discontinue data transmission. When the RLC entity is not connected to the Pcell but is connected only to Scells, the upper entity may configure and transmit an RRC message to the BS so as to report a Scell RLF. Then, each of the entities (e.g., the PDCP entity, the RLC entity, or the MAC entity) may continue data transmission.

In the procedure above, when a retransmission count for preset data reaches a maximum retransmission count, the RLC entity is configured to report to its upper entity, and when the RLC entity is connected to the Pcell, the upper entity may trigger an RLF and may indicate each of the entities to discontinue transmission. However, when the RLC entity is not connected to the Pcell but is connected only to the Scells, the upper entity may trigger a Scell RLF and may not perform particular indication on each of the entities, thereby allowing the entities to continue data transmission. Therefore, in a case where the Scell RLF is triggered, transmission and retransmission of data are continued in the RLC entity, and thus, a retransmission count for another data except for the data for which the maximum retransmission count has been reached may reach a maximum retransmission count. Accordingly, in a case where the retransmission count for the other data reaches the maximum retransmission count in the RLC entity, only when the RLC entity has not previously reported, to the upper entity, an indication indicating that a retransmission count has reached a maximum retransmission count, the RLC entity may report it to its upper entity (e.g., the RRC entity), such that it is possible to prevent reporting of unnecessary indications.

According to some embodiments, after the upper entity (e.g., the RRC entity) reports the Scell RLF, when a response thereto is not received from the BS in a preset time period, the RRC entity may re-transmit a Scell RLF. That is, in a case where a response to the Scell RLF is not received until a timer runs and then expires, when the timer expires, the upper entity may re-perform reporting by re-transmitting the RRC message about the Scell RLF to the BS.

Furthermore, according to some embodiments, the upper entity may define and run a Scell-RLF reporting-prohibit timer, and, while the Scell-RLF reporting-prohibit timer is running, even when the upper entity receives an indication indicating that a retransmission count has reached a maximum retransmission count from the RLC entity, the upper entity does not report a Scell RLF, and after a timer expires, the upper entity may report the Scell RLF, or when the indication indicating that a retransmission count has reached a maximum retransmission count is received after the Scell-RLF reporting-prohibit timer expires, the upper entity may report the Scell RLF.

Furthermore, according to some embodiments, the upper entity may define and run a maximum retransmission count-reached indication prohibit timer, and, while the maximum retransmission count-reached indication prohibit timer is running, even when a case where a retransmission count has reached a maximum retransmission count occurs in the RLC entity, the RLC entity does not report the indication to the upper entity, and after the maximum retransmission count-reached indication prohibit timer expires, the RLC entity may report the indication, or when a retransmission count has reached a maximum retransmission count after the maximum retransmission count-reached indication prohibit timer expires, the RLC entity may report the indication.

Figure 1G:
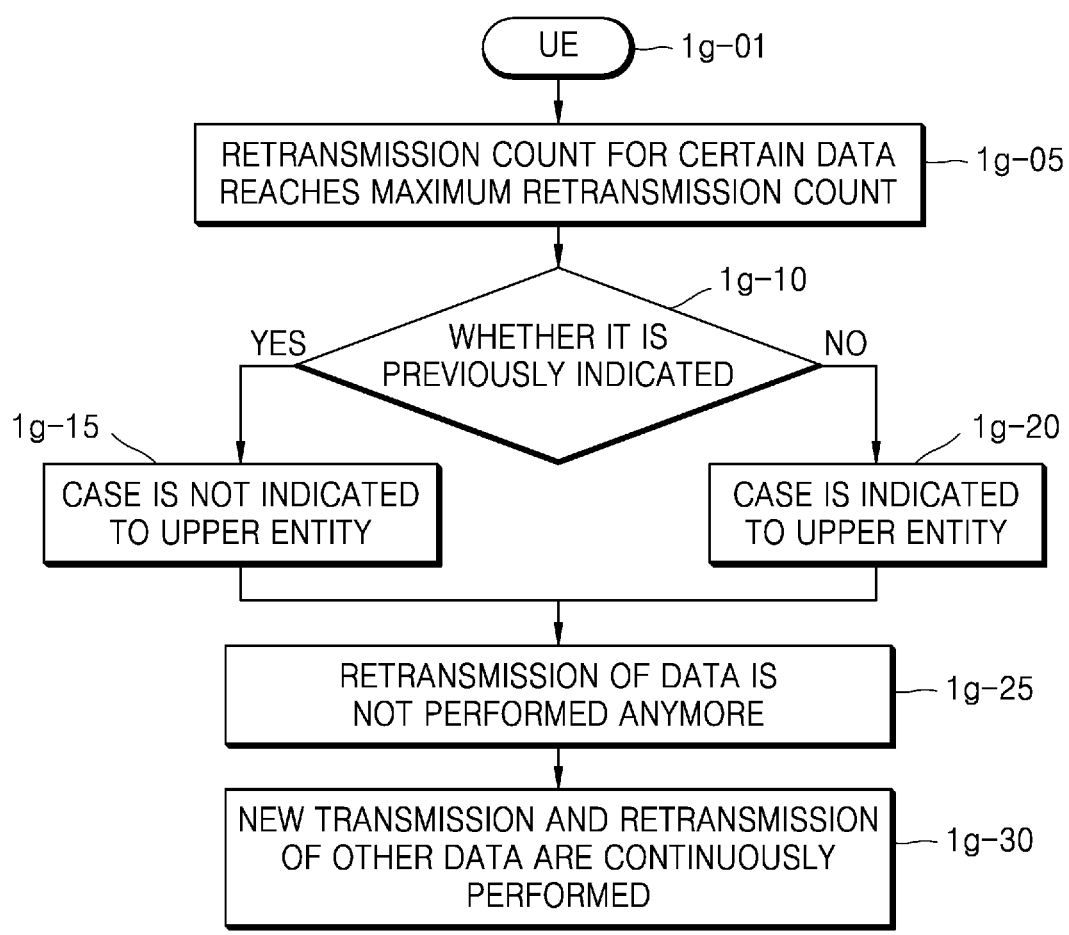
FIG. 1G is a diagram for describing operations of a UE according to some embodiments of the disclosure.

FIG. 1G is a diagram for describing operations of a UE according to some embodiments of the disclosure.

The operations of the UE of FIG. 1G are based on Embodiment 4 from among the aforementioned embodiments. The UE of the disclosure may operate according to at least one of Embodiment 1 to Embodiment 4, and may perform operations by combinations of some or all of the embodiments.

According to some embodiments, when a retransmission count for certain data reaches a maximum retransmission count in an RLC entity of a UE 1g-01 which operates in an AM (operation 1g-05), the UE checks whether an indication indicating that the retransmission count of the RLC entity has reached the maximum retransmission count is previously indicated to its upper entity (e.g., an RRC entity) (operation 1g-10). That is, the UE may check whether a case where the retransmission count of the RLC entity has reached the maximum retransmission count is previously indicated or reported to the upper entity. When the case has been previously indicated (or informed or reported), the UE does not indicate that the retransmission count of the RLC entity has reached the maximum retransmission count (operation 1g-15). When the case has not been previously indicated, the UE indicates that the retransmission count of the RLC entity has reached the maximum retransmission count (operation 1g-20). Then, the UE does not perform anymore retransmission of data for which the retransmission count has reached the maximum retransmission count (operation 1g-25). The UE may continuously perform new transmission and retransmission of other data (operation 1g-30).

As described above, when the packet duplication transmission is applied in the next-generation mobile communication system, a method of calculating whether a maximum retransmission count for certain data has been reached and an efficient method of reporting a Scell RLF in the RLC entity configured to transmit data to a Scell are provided, such that an incorrect operation of the UE may be prevented, and the UE may not unnecessarily report a Scell RLF to the BS a plurality of times.

Figure 1H:
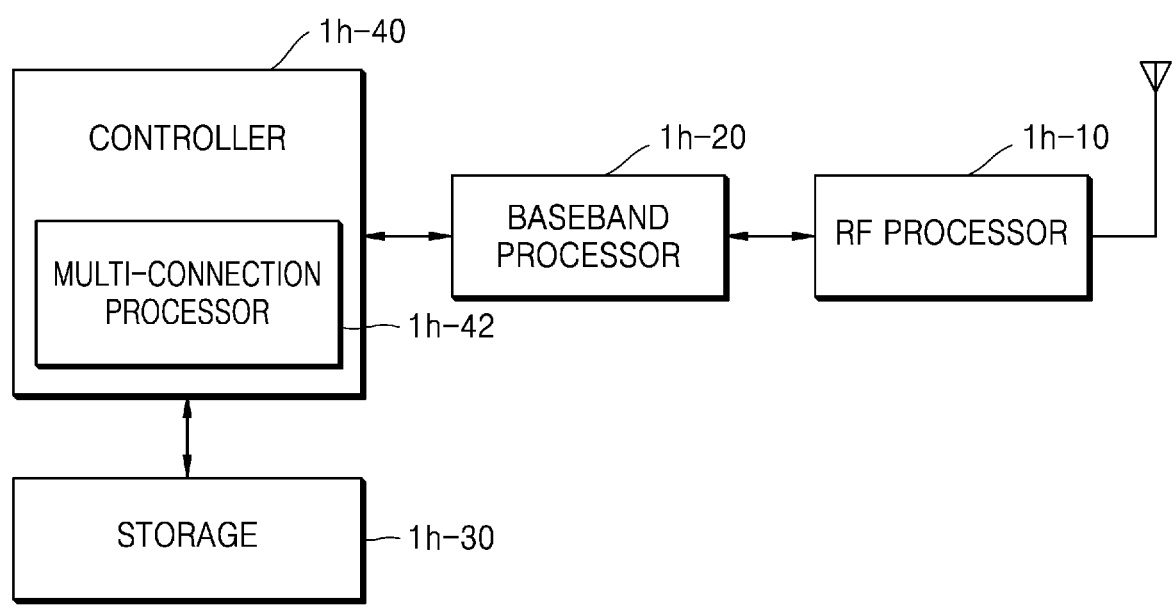
FIG. 1H illustrates a configuration of a UE according to some embodiments of the disclosure.

FIG. 1H illustrates a configuration of a UE according to some embodiments of the disclosure.

Referring to FIG. 1H, the UE includes a Radio Frequency (RF) processor 1h-10, a baseband processor 1h-20, a storage 1h-30, and a controller 1h-40. However, the UE is not limited thereto and may include more elements than the elements shown in FIG. 1H or may include less elements than the shown elements.

The RF processor 1h-10 may perform functions for transmitting and receiving signals through radio channels, e.g., band conversion and amplification of the signals. That is, the RF processor 1h-10 may up-convert a baseband signal provided from the baseband processor 1h-20, into an RF band signal and then may transmit the RF band signal through an antenna, and may down-convert an RF band signal received through the antenna, into a baseband signal. For example, the RF processor 1h-10 may include a transmit filter, a receive filter, an amplifier, a mixer, an oscillator, a digital-to-analog convertor (DAC), an analog-to-digital convertor (ADC), or the like. Although only one antenna is illustrated in FIG. 1H, the UE may include a plurality of antennas. The RF processor 1h-10 may include a plurality of RF chains. The RF processor 1h-10 may perform beamforming. For beamforming, the RF processor 1h-10 may adjust phases and intensities of signals to be transmitted or received through a plurality of antennas or antenna elements. The RF processor 1h-10 may perform a MIMO operation and may receive a plurality of layers in the MIMO operation. In response to the control by the controller 1h-40, the RF processor 1h-10 may perform received beam sweeping by appropriately configuring a plurality of antennas or antenna elements, or may adjust a direction and a beam width of a received beam to coordinate with a transmit beam.

The baseband processor 1h-20 may convert between a baseband signal and a bitstream based on physical entity specifications of a system. For example, for data transmission, the baseband processor 1h-20 may generate complex symbols by encoding and modulating a transmit bitstream. For data reception, the baseband processor 1h-20 may reconstruct a received bitstream by demodulating and decoding a baseband signal provided from the RF processor 1h-10. For example, according to an OFDM scheme, for data transmission, the baseband processor 1h-20 may generate complex symbols by encoding and modulating a transmit bitstream, may map the complex symbols to subcarriers, and then may configure OFDM symbols by performing inverse fast Fourier transform (IFFT) and cyclic prefix (CP) insertion. For data reception, the baseband processor 1h-20 may segment a baseband signal provided from the RF processor 1h-10, into OFDM symbol units, may reconstruct signals mapped to subcarriers by performing fast Fourier transform (FFT), and then may reconstruct a received bitstream by demodulating and decoding the signals.

The baseband processor 1h-20 and the RF processor 1h-10 may transmit and receive signals as described above. The baseband processor 1h-20 and the RF processor 1h-10 may also be called a transmitter, a receiver, a transceiver, or a communicator. At least one of the baseband processor 1h-20 and the RF processor 1h-10 may include a plurality of communication modules to support a plurality of different radio access technologies. At least one of the baseband processor 1h-20 and the RF processor 1h-10 may include different communication modules to process signals of different frequency bands. For example, the different radio access technologies may include an LTE network, an NR network, or the like. The different frequency bands may include a super-high frequency (SHF) (e.g., 2.2 GHz, 2 GHz) band and a millimeter wave (mmWave) (e.g., 60 GHz) band. The UE may transmit and receive signals to and from the BS by using the baseband processor 1h-20 and the RF processor 1h-10. In this regard, the signals may include control information and data.

The storage 1h-30 may store basic programs, application programs, and data, e.g., configuration information, for operations of the UE. The storage 1h-30 may provide the stored data upon request by the controller 1h-40. The storage 1h-30 may include any or a combination of storage media such as read-only memory (ROM), random access memory (RAM), a hard disk, a compact disc (CD)-ROM, and a digital versatile disc (DVD). The storage 1h-30 may include a plurality of memories. According to some embodiments, the storage 1h-30 may store a program for performing the wireless communication method for reporting a Scell RLF.

Figure 1I:
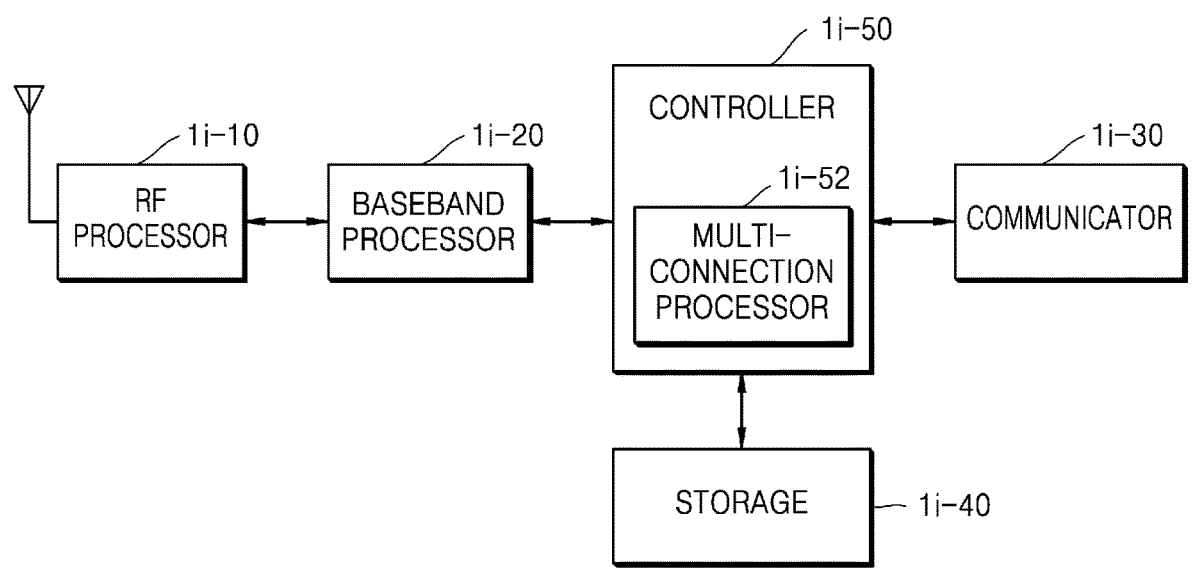
FIG. 1I is a block diagram of a transmission/reception point (TRP) in a wireless communication system, according to some embodiments of the disclosure.

The controller 1h-40 may control overall operations of the UE. For example, the controller 1h-40 transmits and receives signals through the baseband processor 1h-20 and the RF processor 1h-10. Furthermore, the controller 1h-40 records and reads data on or from the storage 1h-30. To this end, the controller 1h-40 may include at least one processor. For example, the controller 1h-40 may include a communication processor (CP) for controlling communications and an application processor (AP) for controlling an upper layer such as an application program. Furthermore, at least one element in the UE may be implemented as a chip. FIG. 1I is a block diagram of a transmission/reception point (TRP) in a wireless communication system, according to some embodiments of the disclosure.

Referring to FIG. 1I, the BS may include a RF processor 1i-10, a baseband processor 1i-20, a communicator 1i-30, a storage 1i-40, and a controller 1i-50. However, the TRP is not limited thereto and may include more elements than the elements shown in FIG. 1I or may include less elements than the shown elements.

The RF processor 1i-10 may perform functions for transmitting and receiving signals through radio channels, e.g., band conversion and amplification of the signals. That is, the RF processor 1i-10 may up-convert a baseband signal provided from the baseband processor 1i-20, into an RF band signal and then may transmit the RF band signal through an antenna, and may down-convert an RF band signal received through an antenna, into a baseband signal. For example, the RF processor 1i-10 may include a transmit filter, a receive filter, an amplifier, a mixer, an oscillator, a DAC, an ADC, or the like. Although only one antenna is illustrated in FIG. 1I, the RF processor 1i-10 may include a plurality of antennas. Also, the RF processor 1i-10 may include a plurality of RF chains. In addition, the RF processor 1i-10 may perform beamforming. For beamforming, the RF processor 1i-10 may adjust phases and intensities of signals to be transmitted or received through a plurality of antennas or antenna elements. The RF processor 1i-10 may perform a DL MIMO operation by transmitting one or more layers.

The baseband processor 1i-20 may convert between a baseband signal and a bitstream based on physical entity specifications of a radio access technology. For example, for data transmission, the baseband processor 1i-20 generates complex symbols by encoding and modulating a transmit bitstream. For data reception, the baseband processor 1i-20 may reconstruct a received bitstream by demodulating and decoding a baseband signal provided from the RF processor 1i-10. For example, according to an OFDM scheme, for data transmission, the baseband processor 1i-20 generates complex symbols by encoding and modulating a transmit bitstream, maps the complex symbols to subcarriers, and then configures OFDM symbols by performing IFFT and CP insertion. For data reception, the baseband processor 1i-20 may segment a baseband signal provided from the RF processor 1i-10, into OFDM symbol units, may reconstruct signals mapped to subcarriers by performing FFT, and then may reconstruct a received bitstream by demodulating and decoding the signals. The baseband processor 1i-20 and the RF processor 1i-10 may transmit and receive signals as described above. As such, the baseband processor 1i-20 and the RF processor 1i-10 may also be called a transmitter, a receiver, a transceiver, a communicator, or a wireless communicator. The BS may transmit and receive signals to and from the UE by using the baseband processor 1i-20 and the RF processor 1i-10. In this regard, the signals may include control information and data.

The communicator 1i-30 may provide an interface for communicating with other nodes in a network. According to some embodiments, the communicator 1i-30 may be a backhaul communicator.

The storage 1i-40 may store basic programs, application programs, and data, e.g., configuration information, for operations of the BS. The storage 1i-40 may store, for example, information about bearers assigned for a connected UE and measurement results reported from the connected UE. The storage 1i-40 may store criteria information used to determine whether to provide or release dual connectivity to or from the UE. The storage 1i-40 may provide the stored data upon request by the controller 1i-50. The storage 1i-40 may include any or a combination of storage media such as ROM, RAM, a hard disk, a CD-ROM, and a DVD. The storage 1i-40 may include a plurality of memories. According to some embodiments, the storage 1i-40 may store a program for performing the wireless communication method for reporting a Scell RLF.

The controller 1i-50 may control overall operations of the BS. For example, the controller 1i-50 transmits and receives signals through the baseband processor 1i-20 and the RF processor 1i-10, or the communicator 1i-30. The controller 1i-50 records and reads data on or from the storage 1i-40. To this end, the controller 1i-50 may include at least one processor. Furthermore, at least one element in the TRP may be implemented as a chip.

Figure 2A:
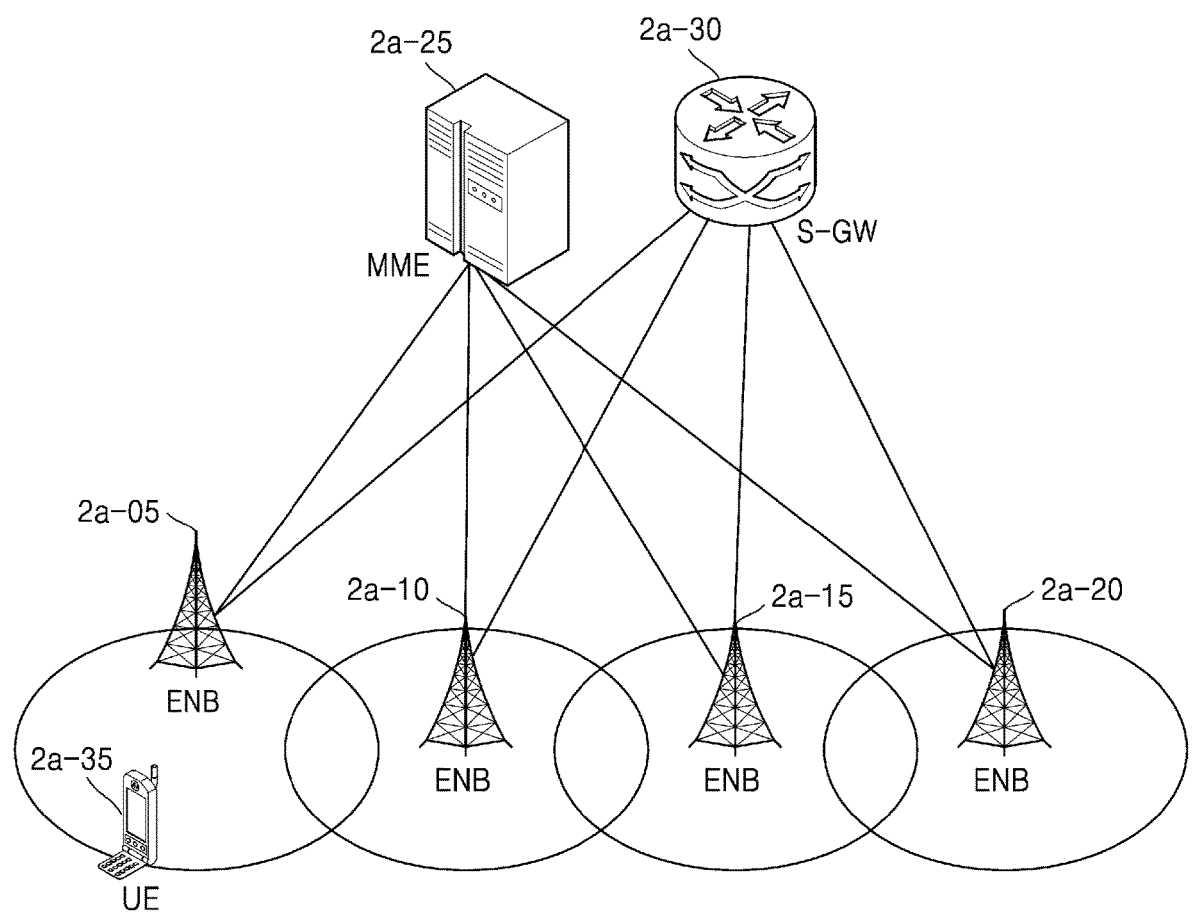
FIG. 2A is a diagram illustrating a configuration of an LTE system, according to some embodiments of the disclosure.

FIG. 2A is a diagram illustrating a configuration of an LTE system, according to some embodiments of the disclosure.

According to some embodiments, an NR system may have a configuration corresponding to that of FIG. 2A. Referring to FIG. 2A, a wireless communication system includes a plurality of eNBs 2a-05, 2a-10, 2a-15, and 2a-20, an MME 2a-25, and an S-GW 2a-30. A UE 2a-35 may access an external network via the eNBs 2a-05, 2a-10, 2a-15, or 2a-20 and the S-GW 2a-30.

The eNBs 2a-05, 2a-10, 2a-15, and 2a-20 refer to access nodes of a cellular network and provide a wireless access to UEs that access the network. That is, in order to service traffic of users, the eNBs 2a-05, 2a-10, 2a-15, and 2a-20 perform scheduling by collating status information, e.g., buffer status information, available transmission power status information, and channel state information of UEs, and thus support connection between the UEs and a core network (CN). The MME 2a-25 is an entity for performing a mobility management function and various control functions on a UE and may be connected to the plurality of eNBs. The S-GW 2a-30 may be an entity for providing data bearers. Furthermore, the MME 2a-25 and the S-GW 2a-30 may further perform authentication, bearer management, or the like with respect to a UE attempting to access the network, and may process packets received from the eNBs 2a-05, 2a-10, 2a-15, and 2a-20 or packets to be transferred to the eNBs 2a-05, 2a-10, 2a-15, and 2a-20.

Figure 2B:
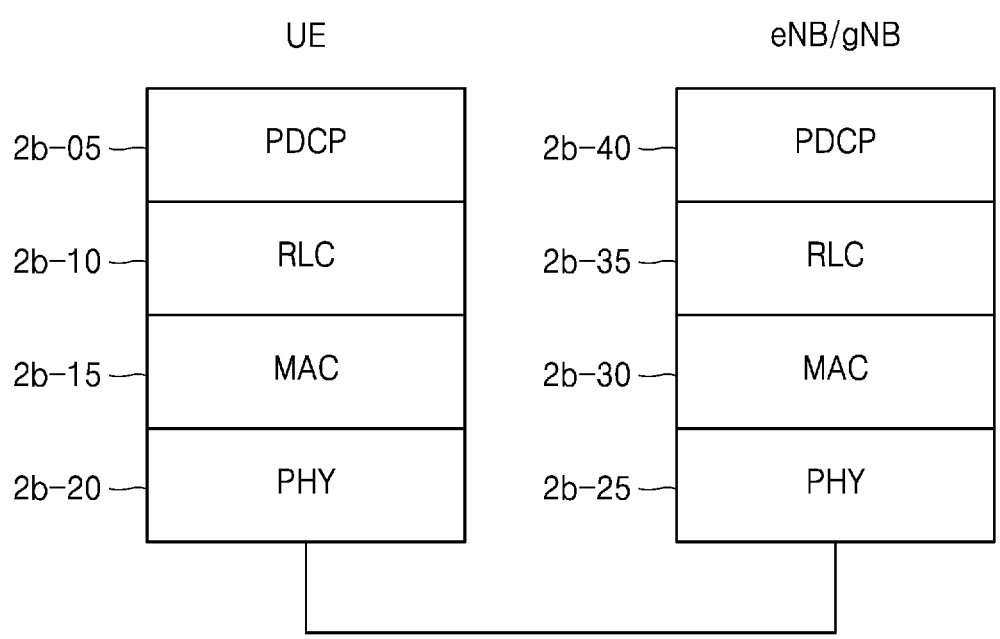
FIG. 2B illustrates radio protocol architectures of an LTE system and a new radio (NR) system to be referenced for descriptions of the disclosure.

FIG. 2B illustrates radio protocol architectures of an LTE system and an NR system to be referenced for descriptions of the disclosure.

Referring to FIG. 2B, radio protocols of the LTE system may include PDCP entities 2b-05 and 2b-40, RLC entities 2b-10 and 2b-35, and MAC entities 2b-15 and 2b-30 respectively in a UE and eNB/gNB. Obviously, the disclosure is not limited to the above example.

With respect to an MAC entity, a UE includes MAC entities corresponding to the number of BSs that are simultaneously configured. For example, when the UE communicates with one BS, one MAC entity is present, and when the UE uses a DC technique of simultaneously communicating with two BSs, two MAC entities for the respective BSs are present in the UE.

According to some embodiments, the PDCP entity 2b-05 or 2b-40 performs operations of IP header compression/decompression, and the RLC entity 2b-10 or 2b-35 reconfigures PDCP PDUs to appropriate sizes. The MAC entity 2b-15 or 2b-30 may be connected to a plurality of RLC entities configured for one UE and may multiplex RLC PDUs into a MAC PDU and may demultiplex the RLC PDUs from the MAC PDU.

A physical (PHY) entity 2b-20 or 2b-25 may channel-code and modulate upper layer data into OFDM symbols and transmit the OFDM symbols through a radio channel, or may demodulate OFDM symbols received through a radio channel and channel-decode and deliver the OFDM symbols to an upper layer. In order to additionally correct an error, the PHY entity may use HARQ, and a receiver may transmit, by using 1 bit, whether or not a packet transmitted from a transmitter is received. This is called HARQ ACK/NACK information. In the LTE system, DL HARQ ACK/NACK information about UL data transmission is transmitted through a Physical Hybrid-ARQ Indicator Channel (PHICH) physical channel, and in the NR system, a UE may determine, based on scheduling information for the UE, whether retransmission or new transmission through a Physical Dedicated Control Channel (PDCCH) that is a channel through which DL/UL resource allocation is transmitted is requested. This is because asynchronous HARQ is applied in the NR system.

According to some embodiments, UL HARQ ACK/NACK information about DL data transmission may be transmitted through a PUCCH or Physical Uplink Shared Channel (PUSCH) physical channel. The PUCCH is transmitted in a UL of a PCell to be described below, but, when a UE supports, a BS may allow a SCell to additionally transmit it to the UE, and this is called the PUCCH SCell.

Although not illustrated in drawings, RRC entities are present above the PDCP entities of the UE and the BS, respectively, and each of the RRC entities may transmit or receive configuration control messages related to access and measurement to control radio resources.

The PHY entity may be configured to correspond to one or more frequencies/carriers, and a technology by which a plurality of frequencies are simultaneously configured and used is referred to as the CA technology. Only one carrier was used to be used for communication between a UE and an E-UTRAN NodeB (eNB), but, according to the CA technology, one main carrier and one or more subcarriers are additionally used such that an amount of data transmission may be significantly increased as much as the number of subcarriers. In the LTE system, a cell in a BS which uses a main carrier is referred to as a main cell or PCell, and a cell in the BS which uses a subcarrier is referred to as a sub-cell or a SCell.

Figure 2C:
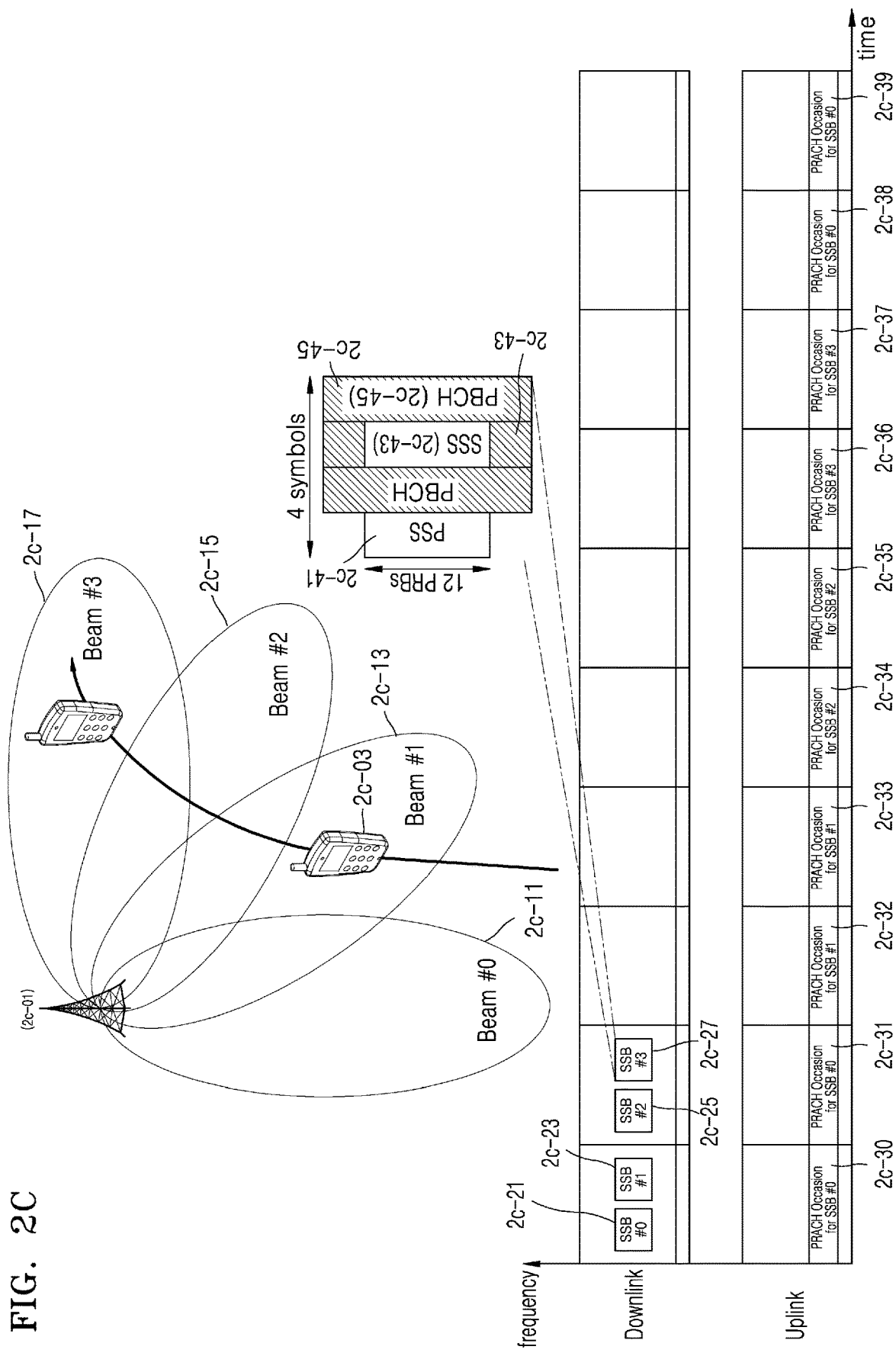
FIG. 2C illustrates downlink (DL) and uplink (UL) channel frame structures when a beam-based communication is performed in an NR system, according to some embodiments of the disclosure.

FIG. 2C illustrates DL and UL channel frame structures when a beam-based communication is performed in an NR system, according to some embodiments of the disclosure.

In FIG. 2C, a BS 2c-01 may transmit signals in the form of beams 2c-11, 2c-13, 2c-15, and 2c-17 so as to transmit the signals via wider coverage or to transmit strong signals. A UE 2c-03 within a cell needs to transmit or receive data by using a particular beam (beam #1 2c-13 in FIG. 2C) transmitted by the BS.

According to some embodiments, whether or not a UE is connected to a BS, states of the UE are classified into an idle mode (RRC_IDLE) and a connected mode (RRC_CONNECTED). Thus, the BS may not detect a location of the UE in the idle mode.

When the UE in the idle mode attempts to switch its state to a connected mode state, the UE receives Synchronization Signal Blocks (SSBs) 2c-21, 2c-23, 2c-25, and 2c-27 transmitted from the BS. An SSB is an SSB signal that is periodically transmitted at intervals configured by the BS, and each SSB is segmented to a Primary Synchronization Signal (PSS) 2c-41, a Secondary Synchronization Signal (SSS) 2c-43, and a Physical Broadcast Channel (PBCH) (2c-45).

In FIG. 2C, a scenario in which SSBs are transmitted by using respective beams is assumed. For example, it is assumed that SSB #0 2c-21 is transmitted by using beam #0 2c-11, SSB #1 2c-23 is transmitted by using beam #1 2c-13, SSB #2 2c-25 is transmitted by using beam #2 2c-15, and SSB #3 2c-27 is transmitted by using beam #3 2c-17. With reference to FIG. 2C, it is assumed that an idle-mode UE is located on beam #1, but even when a connected-mode UE performs a random access, the UE selects an SSB that is received when the random access is performed.

Referring to FIG. 2C, the UE 2c-03 receives SSB #1 2c-23 transmitted using beam #1 2c-13. Upon reception of SSB #1 2c-23, the UE may obtain a Physical Cell Identifier (PCI) of the BS by referring to a PSS and a SSS, and may receive a PBCH, thereby identify that an identifier (i.e., #1) of the currently received SSB, in which location within a 10 ms frame the current SSB is received, and in which System Frame Number (SFN) the SSB is present in SFNs having an interval of 10.24 seconds. Furthermore, the PBCH includes a Master Information Block (MIB), and the MIB includes information indicating at which location a system information block type 1 (SIB1) that broadcasts detailed configuration of a cell may be received. Upon reception of SIB1, the UE may detect a total number of SSBs transmitted by the BS, and may detect a location of a Physical Random Access Channel (PRACH) occasion in which the UE can perform a random access to switch to a connected mode state (more particularly, the UE can transmit a preamble that is specially designed to synchronize UL synchronization) (in FIG. 2C, a scenario where PRACH occasion is allocated at every 1 ms is assumed, and referring to FIG. 2C, the UE can detect PRACH occasions 2c-30 to 2c-39).

Furthermore, the UE may detect, based on SIB1 information, which PRACH occasion from among the PRACH occasions 2c-30 to 2c-39 is to be mapped to which SSB index. For example, in FIG. 2C, the scenario where PRACH occasion is allocated at every 1 ms is assumed, and in the scenario, ½ SSB is allocated to one PRACH occasion (i.e., two PRACH occasions per one SSB). Accordingly, FIG. 2C illustrates the scenario in which two PRACH occasions are allocated to each SSB, the two PRACH occasions starting from a PRACH occasion based on an SFN value. That is, PRACH occasions 2c-30 and 2c-31 may be allocated for SSB #0, and PRACH occasions 2c-32 and 2c-33 may be allocated for SSB #1. When a PRACH occasion is allocated to all SSBs, PRACH occasions 2c-38 and 2c-39 may be allocated again to an initial SSB.

The UE recognizes locations of PRACH occasions 2c-32 and 2c-33 for SSB #1, and transmits a random access preamble in an earlier PRACH occasion (e.g., 2c-32) from among PRACH occasions 2c-32 and 2c-33 corresponding to SSB #1. Because the BS receives the preamble in PRACH occasion 2c-32, the BS may recognize that the UE has transmitted the preamble by selecting SSB #1, and when a random access is performed, data may be transmitted or received on a beam corresponding to SSB #1.

When a UE in a connected state moves to a target BS from a current (source) BS due to handover, etc., the UE performs a random access on the target BS, and performs an operation of transmitting the random access preamble by selecting an SSB as described above. Furthermore, in the handover, the source BS transmits a handover command to the UE to switch from the source BS to the target BS, and a handover command message transmitted from the source BS may include a UE-dedicated random access preamble identifier for each SSB of the target BS, which is allocated by the target BS, for the UE can use when the UE performs a random access on the target BS.

According to some embodiments, a BS may not allocate dedicated random access preamble identifiers to all beams, in consideration of a current location of a UE. Therefore, dedicated random access preambles may not be allocated to some SSBs (e.g., dedicated random access preambles are allocated only to Beams #2 and #3). In a case where a dedicated random access preamble is not allocated to an SSB the UE selects for transmission of a preamble, the UE randomly selects a contention-based random access preamble and then performs a random access. For example, in FIG. 2C, after the UE first located on Beam #1 and then performed a random access but failed, when the UE retransmits a random access preamble, the UE may locate on Beam #3 and may transmit a dedicated preamble. That is, when retransmission of a preamble occurs during one random access procedure, whether a dedicated random access preamble is allocated to a selected SSB at every transmission of a preamble, a contention-based random access procedure and a contention-free random access procedure may coexist.

Figure 2D:
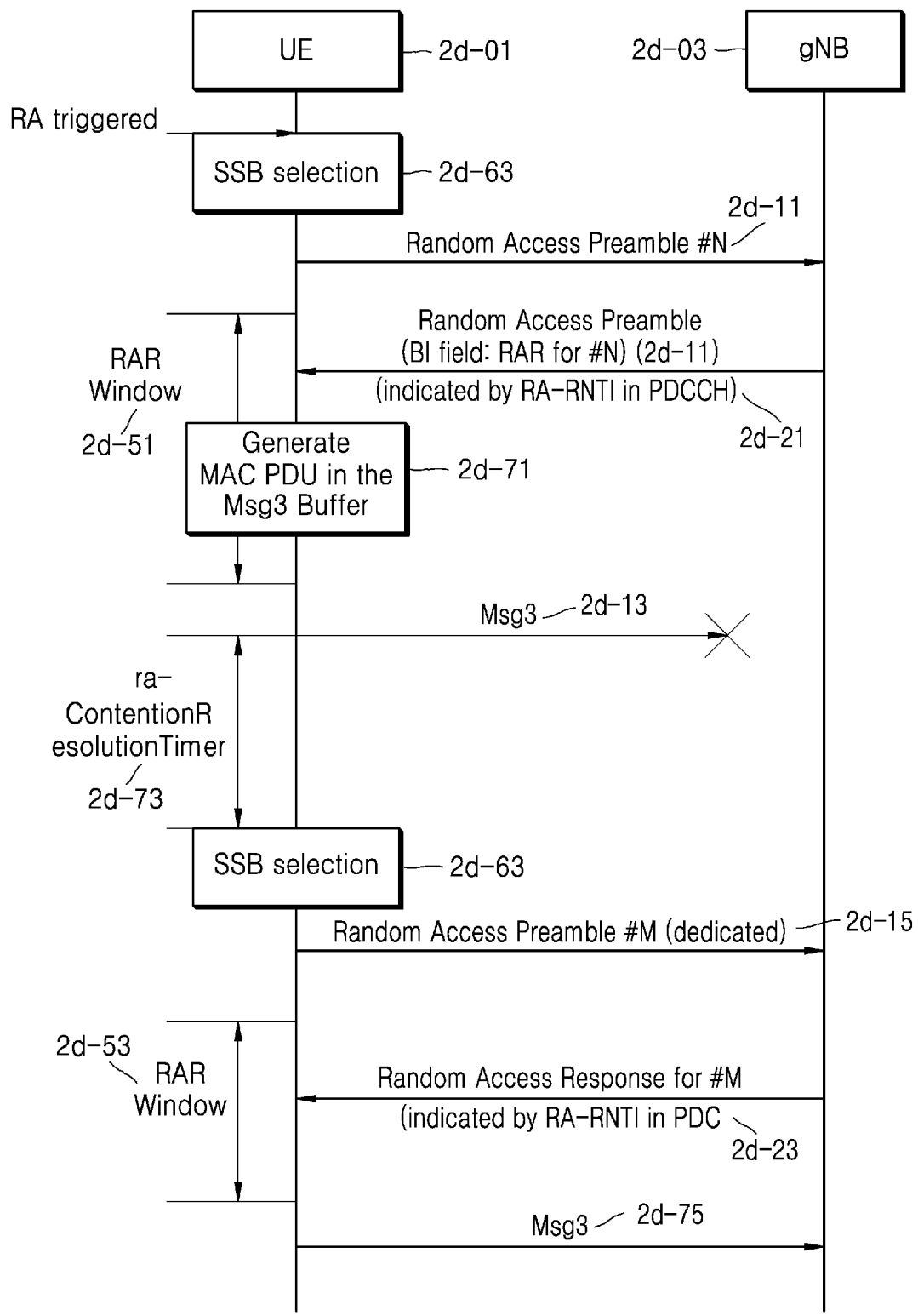
FIG. 2D illustrates contention and contention-free random access procedures performed in a situation such as handover by a UE to a BS, according to some embodiments of the disclosure.

FIG. 2D illustrates contention-based and contention-free random access procedures performed in a situation such as handover by a UE to a BS, according to some embodiments of the disclosure.

A random access procedure may include a contention-based random access procedure and a contention-free random access procedure, and in the contention-free random access procedure, a procedure in which the BS allocates a dedicated random access resource to the UE so as to allow the UE to perform a contention-free random access exists before a random access. The dedicated random access resource may refer to a particular preamble index and/or a PRACH resource on a particular time/frequency. Also, information for allocating the dedicated random access resource may be allocated through a PDCCH or may be transmitted through an RRC layer message. The RRC layer message may include an RRCReconfiguration message (e.g., for handover). Therefore, in a case where a dedicated random access resource allocated by the BS is present for SSB/Channel State Information Reference Signal (CSI-RS) the UE selects for a random access procedure that is being currently performed, the UE transmits a random access preamble on the corresponding random access resource. Also, in a contention-free random access, when a preamble transmitted by the UE is present in a Random Access Response (RAR) message to be described below, the UE determines that the random access is successfully completed, and thus ends a random access procedure.

FIG. 2D illustrates an assumed case in which, when a handover command is received from a previous source BS in a handover situation, a preamble identifier M is received for SSB #3.

Accordingly, a UE 2d-01 first moves to a target BS 2d-03 (also referred to as the gNB 2d-03), and then determines on which beam the UE 2d-01 is requested to perform data transmission and reception including a random access, and selects a SSB, based on the determination (operation 2d-63). According to a method of selecting an SSB, a BS transmits a preset threshold through a SIB1 or configuration information in a handover message, and a UE selects one of received SSBs whose signal power exceeds the threshold. For example, in FIG. 2C, in a case where the UE receives all of SSB #0, SSB #1, and SSB #2, but only a signal power of SSB #1 exceeds the threshold and signal powers of SSB #0 and SSB #2 do not exceed the threshold, the UE may select SSB #1. The threshold may be configured through the SIB1 or a message of an RRC entity which is directly provided to the UE, and may be indicated as rsrp-ThresholdSSB or rsrp-ThresholdCSI-RS which is a value of a Reference Signal Received Power (RSRP) of a SSB or a RSRP of a CSI-RS.

As described above, when the UE selects the SSB, the UE may detect a PRACH Occasion mapped to the selected SSB and then may transmit, to the BS, a random access preamble in the PRACH Occasion (operation 2d-11). In this regard, because a dedicated preamble is not allocated to SSB #1, a contention-based random access may be performed. That is, one of contention-based preamble identifiers may be randomly selected and then transmitted (in drawing, it is assumed that #N is selected and transmitted).

Also, a case in which one or more UEs simultaneously transmit random access preambles in a PRACH Occasion may occur. That is, another UE may randomly select a resource and may perform transmission using the resource, and may equally select preamble #N. A PRACH resource may extend over one subframe or only some symbols in one subframe may be used. PRACH resource information may be included in system information or configuration information in a handover command, which is broadcast by the BS, such that the UE may know, based on the PRACH resource information, in which time and frequency resources a preamble has to be transmitted. Also, a plurality of preamble identifiers (indices) may be present for random access preambles according to a standard as a particular sequence uniquely designed to be receivable when the random access preambles are transmitted before synchronization with the BS is completed. When the plurality of preamble identifiers (indices) are present, a preamble to be transmitted by the UE may be randomly selected by the UE or may be specified by the BS.

Also, in a case where the UE in a connected mode state in a procedure of selecting an SSB performs a random access, when the BS previously configures a particular signal to be measured, the UE may select a PRACH occasion, based on the particular signal to be measured, instead of the SSB. The particular signal to be measured may be a SSB or a CSI-RS. For example, when the UE performs handover to a different BS due to movement of the UE, the UE may select a PRACH occasion mapped to a SSB or a CSI-RS of a target BS which is included in a handover command. The UE measures a configured signal, thereby determining in which PRACH occasion a random access preamble is to be transmitted.

When the BS receives the preamble transmitted by the UE 2d-01 (or a preamble transmitted by another UE), the BS may transmit an RAR message with respect to the received preamble to the UE (operation 2d-21). The RAR message may include preamble identifier information used in operation 2d-11, UL transmission timing advance adjust information, UL resource allocation information to be used in operation thereafter, temporary UE identifier information, and the like.

According to some embodiments, when a plurality of UEs attempt random accesses by transmitting different preambles in operation 2d-11, the preamble identifier information may be included to indicate for which preamble the RAR message transmitted by the BS is a response message.

According to some embodiments, the UL resource allocation information refers to detailed information of a resource to be used by the UE, and may include a modulation and coding scheme (MCS) to be used in transmission, power adjustment information for transmission, or the like.

According to some embodiments, when the UE that transmits a preamble performs an initial access, the UE does not have an identifier allocated by the BS for communication with the BS, and thus the temporary UE identifier information is transmitted as a value to be used as the identifier.

The RAR message has to be transmitted within a preset time period after a preset time elapses after the UE transmits the preamble, and the preset time period is referred to as an "RAR window" (operations 2d-51 and 2d-53). The RAR window starts after the preset time elapses after a very first preamble is transmitted. According to some embodiments, the preset time may have a value of a subframe unit (2 ms) or a smaller value. However, the disclosure is not limited to the above example. Furthermore, a length of the RAR window may be configured in a system information message or a handover command message which is broadcast by the BS.

When the RAR window is transmitted, the BS schedules a corresponding RAR message through a PDCCH, and its scheduling information is scrambled by a Random Access-Radio Network Temporary Identifier (RA-RNTI). The RA-RNTI is mapped to a PRACH resource used in transmission of the random access preamble message (in operation 2d-11), and the UE that transmits the preamble in the particular PRACH resource attempts reception of a PDCCH based on the RA-RNTI, thereby determining whether there is a corresponding RAR message. When the RAR message is a response to the preamble the UE transmitted in operation 2d-11 as in FIG. 2D, the RA-RNTI used in scheduling information about the RAR message may include information about transmission in operation 2d-11. To do so, the RA-RNTI may be calculated according to Equation below.

$$RA\text{-}RNTI = 1s\_id + 14 \times t\_id + 14 \times 80 \times f\_id + 14 \times 80 \times 8 \times ul\_carrier\_id$$

In this regard, s_id refers to an index corresponding to a first OFDM symbol in which transmission of the preamble transmitted in operation 2d-11 is started, and has a value of $0 \leq s\_id < 14$ (that is, a maximum number of OFDM symbols in one slot). Also, t_id refers to an index corresponding to a first slot in which transmission of the preamble transmitted in operation 2d-11 is started, and has a value of $0 \leq t\_id < 80$ (that is, a maximum number of slots in one system frame (20 ms)). Also, f_id indicates which ordinal number of PRACH resource the preamble transmitted in operation 2d-11 is transmitted on frequency, and has a value of $0 \leq f\_id < 8$ (that is, a maximum number of PRACHs on frequency in a same time). ul_carrier_id may be a parameter that, when using two carriers as UL with respect to a single cell, distinguishes whether the preamble is transmitted in a normal UL (NUL) (0 in this case) or whether the preamble is transmitted in a supplementary UL (SUL) (1 in this case).

With reference to FIG. 2D, the scenario is assumed, in which the UE receives the RAR message based on the RA-RNTI corresponding to the transmission in operation 2d-11, and the corresponding message includes a response to preamble #N transmitted by the UE. Therefore, the UE fills a message to be transmitted in an Msg3 buffer (in a contention-based random access, a preamble is called Msg1, a RAR is called Msg2, a message to be transmitted thereafter in a UL is called Msg3, and a message to be received thereafter in a DL is called Msg4, and data to be transmitted in the Msg3 is called the Msg3 buffer) in the UE according to a UL resource size for Msg3 allocated in the RAR message (operation 2d-71).

The scenario in FIG. 2D is assumed for a scenario in which the UE in a connected mode performs handover, and thus, the UE is already allocated an identifier within cell (C-RNTI) to be used within a target BS, through the handover command message. The UE may include, in the Msg3, C-RNTI MAC Control Element ((C-RNTI MAC CE) that is a control message of a MAC entity) for indicating that the UE that currently attempts a random access is the UE of the C-RNTI generates data with a handover completion message, based on the UL resource size allocated in the RAR message, and transmits the Msg3 (operation 2d-13).

However, with reference to FIG. 2D, the scenario is assumed, in which transmission of the Msg3 fails (operation 2d-13). That is, the UE transmits the Msg3, and starts a ra-ContentionResolutionTimer timer. When a response to the transmitted Msg3 is not received until the ra-ContentionResolutionTimer timer expires (operation 2d-73), the UE determines that the Msg3 has not been correctly transmitted, and starts a procedure of re-transmitting a random access preamble.

That is, when the ra-ContentionResolutionTimer timer expires, the UE selects again an SSB at a corresponding time point so as to retransmit a preamble (operation 2d-63). Here, it is assumed that the selected SSB is Beam #3 in FIG. 2C. That is, as described above, a case is assumed, in which the UE receives a preamble identifier M for SSB #3 when the UE receives a handover command. Accordingly, the BS retransmits a dedicated preamble in a PRACH occasion corresponding to SSB #3 (operation 2d-15), waits for a response thereto (operation 2d-53) and re-receives an RAR message (operation 2d-23). Because the UE has performed a contention-free random access by performing a random access by using the dedicated preamble, the UE assumes that the random access is successfully completed only when the RAR is received.

Because the re-received RAR message (operation 2d-23) includes UL resource allocation information, the UE may transmit a UL on the resource even when the random access has been already succeeded (operation 2d-75).

In order to transmit the Msg3 so as to perform the previous contention-based random access, the UE already filled the data in the Msg3 buffer. In a case where the data is present in the Msg3 buffer, the UE has to changelessly transmit it to a physical entity. For example, in a case where the size of the UL resource allocation received in the RAR (operation 2d-21) received in the contention-based random access is 56 bytes, and the data in the Msg3 buffer is generated according to 56 bytes, when the contention-based random access fails and then the contention-free random access is performed according to SSB/CSI-RS selected thereafter, the BS may allocate a very large size (e.g., 200 bytes) to the UE. In this case, the UE cannot changelessly transmit a PDU that is already generated in the Msg3 buffer and thus may need to solve this issue.

Figure 2E:
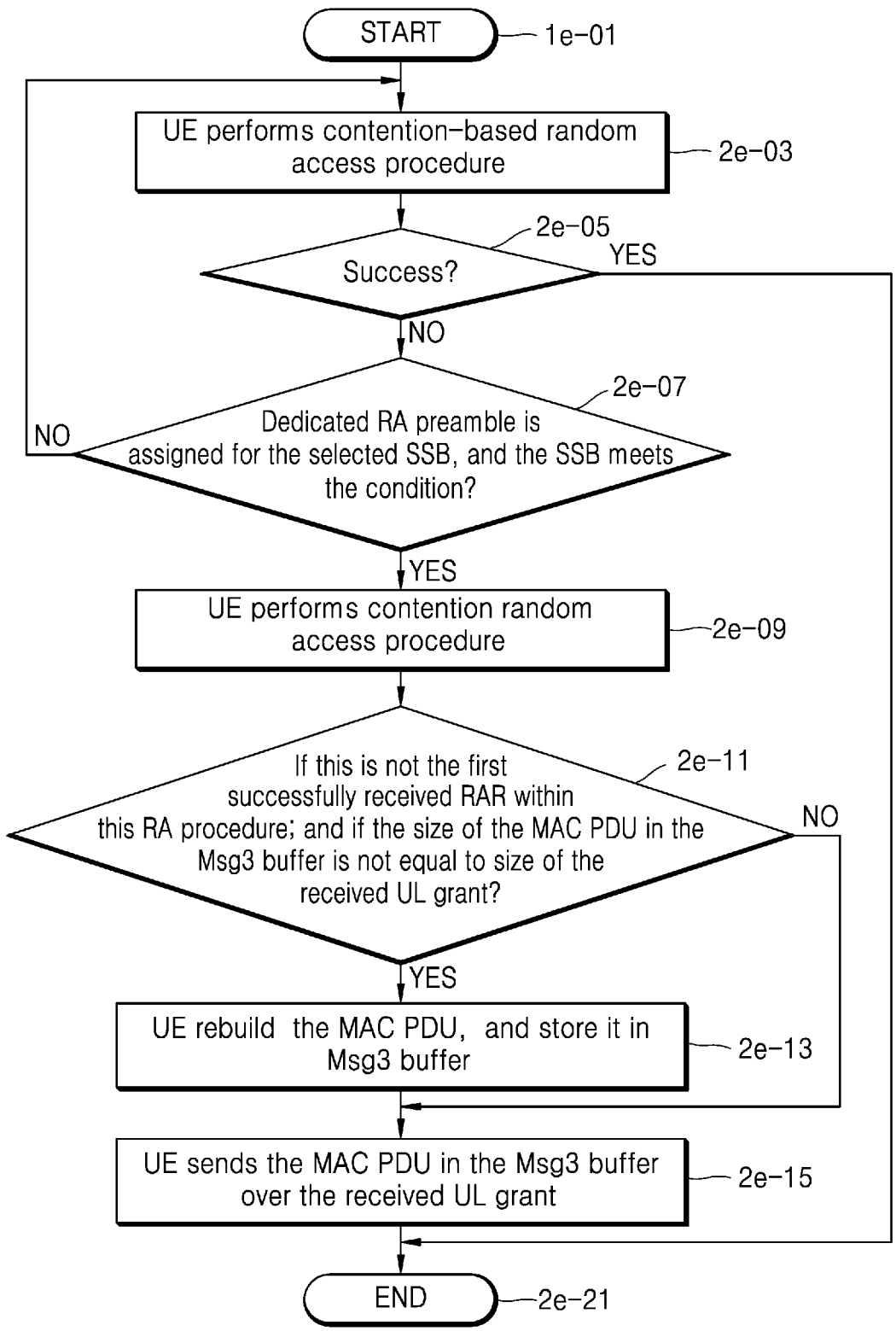
FIG. 2E is a diagram illustrating a procedure of operations of a UE according to Embodiment 1 of a method of generating and transmitting a message3 when the UE performs a random access embodiments of the disclosure.

FIG. 2E is a diagram illustrating a procedure of operations of a UE according to Embodiment 1 of a method of generating and transmitting a message3 when the UE performs a random access embodiments of the disclosure. In descriptions below, the UE may be replaced with the aforementioned MAC entity.

Referring to FIG. 2E, a situation is assumed, in which the UE is in a connected mode and first performs a contention-based random access procedure for handover as in the example of FIG. 2D (operation 2e-03). When the random access fails, the UE determines whether SSB/CSI-RS to which a dedicated random access preamble is assigned meets a condition configured by a BS (operation 2e-07), and when there are SSB/CSI-RS that meet the condition, the UE selects one of the SSB/CSI-RS and performs a contention-free random access by using a preamble assigned to the corresponding SSB/CSI-RS (operation 2e-09).

Afterward, when the UE succeeds in the contention-free random access and thus receives an RAR message in response to the preamble, the UE determines the following so as to transmit data on a UL resource assigned in the RAR message:

In a case where the RAR message is not a first RAR successfully received in a random access procedure, and the UE determines that a size of a MAC PDU stored in an Msg3 buffer is different from a size of UL resource allocation received in the RAR message (or, when the UE determines that the size of the UL resource allocation received in the RAR message is greater) (operation 2e-11), the UE re-generates (or re-builds) the MAC PDU according to the size of the UL resource allocation received in the RAR message and re-stores the MAC PDU in the Msg3 buffer (operation 2e-13). The UE may re-generate the MAC PDU by excluding some MAC subPDUs and including some MAC subPDUs from among MAC subPDUs (sub units that constitute the MAC PDU) that were to be transmitted and are stored in the Msg3 buffer. For example, the UE may re-generate the MAC PDU by including a handover completion RRC message. Also, the UE may add, to the re-generated MAC PDU, a Buffer Status Report (BSR) MAC CE for reporting a buffer status so as to transmit UL data, but it is not necessary to include a MAC CE such as the aforementioned C-RNTI MAC CE in the Msg3 that occurs after the contention-free random access (because the BS already knows which UE has transmitted the preamble), and thus the MAC CE such as the aforementioned C-RNTI MAC CE may be excluded. Also, depending on necessity, the UE may include or may not include a Power Headroom Report (PHR) MAC CE for indicating remaining power for UL by the UE in the re-generated MAC PDU.

Afterward, the UE determines whether a packet is stored in the Msg3 buffer, and when the packet is stored, the UE transmits the packet in the Msg3 buffer on the UL resource received in the RAR message (operation 2e-15).

Figure 2F:
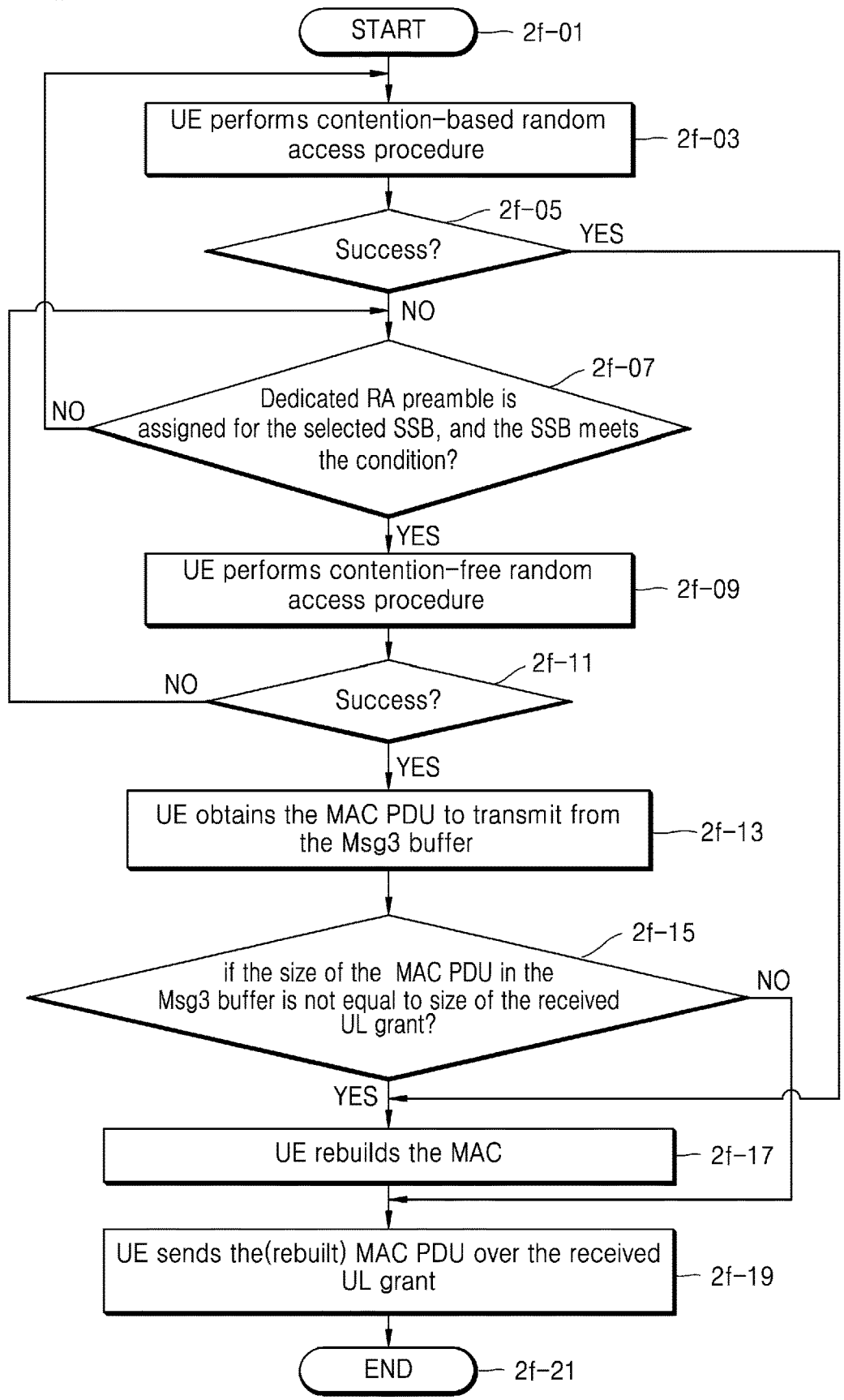
FIG. 2F is a diagram illustrating a procedure of operations of a UE according to Embodiment 2 of a method of generating and transmitting a message3 when the UE performs a random access embodiments of the disclosure.

FIG. 2F is a diagram illustrating a procedure of operations of a UE according to Embodiment 2 of a method of generating and transmitting a message3 when the UE performs a random access embodiments of the disclosure. In descriptions below, the UE may be replaced with the aforementioned MAC entity.

Referring to FIG. 2F, a situation is assumed, in which the UE is in a connected mode and first performs a contention-based random access procedure for handover as in the example of FIG. 2D (operation 2f-03). When the random access fails, the UE determines whether SSB/CSI-RS to which a dedicated random access preamble is assigned meets a condition configured by a BS (operation 2f-07), and when there are SSB/CSI-RS that meet the condition, the UE selects one of the SSB/CSI-RS and performs a contention-free random access by using a preamble assigned to the corresponding SSB/CSI-RS (operation 2f-09).

Afterward, the UE succeeds in the contention-free random access and determines whether the UE receives an RAR message in response to the preamble (operation 2f-11).

When it is successful, as there is data in an Msg3 buffer which is stored during a previous contention-free random access, the UE obtains a packet from the Msg3 buffer so as to transmit it (operation 2f-13). When the UE determines that a size of the obtained packet is different from a size of UL resource allocation received in the RAR message (or, when the UE determines that the size of the UL resource allocation received in the RAR message is greater) (operation 2f-15), the UE re-generates the MAC PDU according to the size of the UL resource allocation received in the RAR message (operation 2f-17). Alternatively, when transmission of the preamble is not selected from among contention-based random access preambles (i.e., selection of a dedicated random access preamble) and the UE determines that the size of the obtained packet is different from the size of the UL resource allocation received in the RAR message (or, when the UE determines that the size of the UL resource allocation received in the RAR message is greater) (operation 2f-15), the UE re-generates the MAC PDU according to the size of the UL resource allocation received in the RAR message (operation 2f-17). The UE may re-generate the MAC PDU by excluding some MAC subPDUs and including some MAC subPDUs from among MAC subPDUs that were to be transmitted from the Msg3 buffer. For example, the UE may re-generate the MAC PDU by including a handover completion RRC message. Also, the UE may add, to the re-generated MAC PDU, a BSR MAC CE for reporting a buffer status so as to transmit UL data, but it is not necessary to include a MAC CE such as the aforementioned C-RNTI MAC CE in the Msg3 that occurs after the contention-free random access (because the BS already knows which UE has transmitted the preamble), and thus the MAC CE such as the aforementioned C-RNTI MAC CE may be excluded. Also, depending on necessity, the UE may include or may not include a PHR MAC CE for indicating remaining power for UL by the UE in the re-generated MAC PDU.

Afterward, the UE transmits the packet (the MAC PDU) on the UL resource received in the RAR message, the packet being re-generated according to the aforementioned procedure or obtained from the Msg3 buffer (operation 2e-15).

Figure 2G:
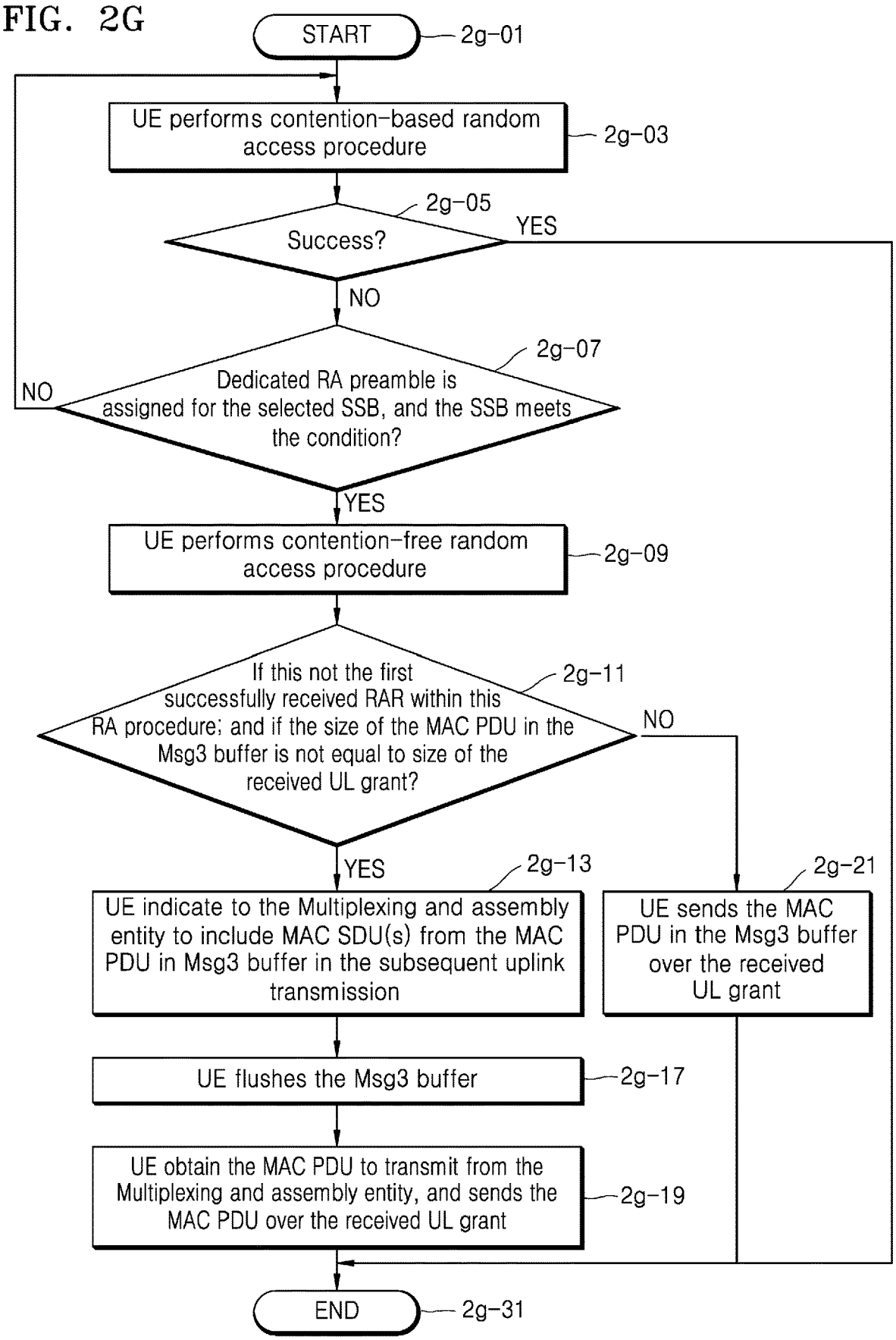
FIG. 2G is a diagram illustrating a procedure of operations of a UE according to Embodiment 3 of a method of generating and transmitting a message3 when the UE performs a random access embodiments of the disclosure.

FIG. 2G is a diagram illustrating a procedure of operations of a UE according to Embodiment 3 of a method of generating and transmitting a message3 when the UE performs a random access embodiments of the disclosure. In descriptions below, the UE may be replaced with the aforementioned MAC entity.

Referring to FIG. 2G, a situation is assumed, in which the UE is in a connected mode and first performs a contention-based random access procedure for handover as in the example of FIG. 2D (operation 2g-03). When the random access fails, the UE determines whether SSB/CSI-RS to which a dedicated random access preamble is assigned meets a condition configured by a BS (operation 2g-07), and when there are SSB/CSI-RS that meet the condition, the UE selects one of the SSB/CSI-RS and performs a contention-free random access by using a preamble assigned to the corresponding SSB/CSI-RS (operation 2g-09).

Afterward, when the UE succeeds in the contention-free random access and thus receives an RAR message about the preamble, the UE determines the following so as to transmit data on a UL resource assigned in the RAR message:

In a case where the RAR message is not a first RAR successfully received in a random access procedure, and the UE determines that a size of a MAC PDU stored in an Msg3 buffer is different from a size of UL resource allocation received in the RAR message (or, when the UE determines that the size of the UL resource allocation received in the RAR message is greater) (operation 2g-11), the UE indicates a multiplexing and assembly entity (that is, a different entity other than the Msg3 buffer) in the UE to re-generate a MAC PDU from a packet stored in the Msg3 buffer, according to the size of the UL resource allocation received in the RAR message (operation 2g-13), and flushes (or deletes) the Msg3 buffer (operation 2g-17). When the UE indicates to re-generate the MAC PDU from the packet stored in the Msg3 buffer, the UE may indicate to re-generate the MAC PDU by excluding some MAC subPDUs and including some MAC subPDUs from among MAC subPDUs that were to be transmitted from the Msg3 buffer. For example, the UE may indicate to re-generate the MAC PDU by including a handover completion RRC message. Also, the UE may add, to the re-generated MAC PDU, a BSR MAC CE for reporting a buffer status so as to transmit UL data, but it is not necessary to include a MAC CE such as the aforementioned C-RNTI MAC CE in the Msg3 that occurs after the contention-free random access (because the BS already knows which UE has transmitted the preamble), and thus the MAC CE such as the aforementioned C-RNTI MAC CE may be excluded. Also, depending on necessity, the UE may include or may not include a PHR MAC CE for indicating remaining power for UL by the UE in the re-generated MAC PDU.

Afterward, the UE determines whether a packet is stored in the Msg3 buffer. In a case where the UE flushes the Msg3 buffer in operation 2g-17 according to the aforementioned procedure, because the UE already indicated the multiplexing and assembly entity to re-generate a packet, the UE obtains the MAC PDU from the entity and then transmits the MAC PDU on the UL resource received in the RAR message (operation 2g-19). Otherwise, the UE transmits the packet stored in the Msg3 buffer, without a change to the packet, on the UL resource received in the RAR message (operation 2g-21).

Figure 2H:
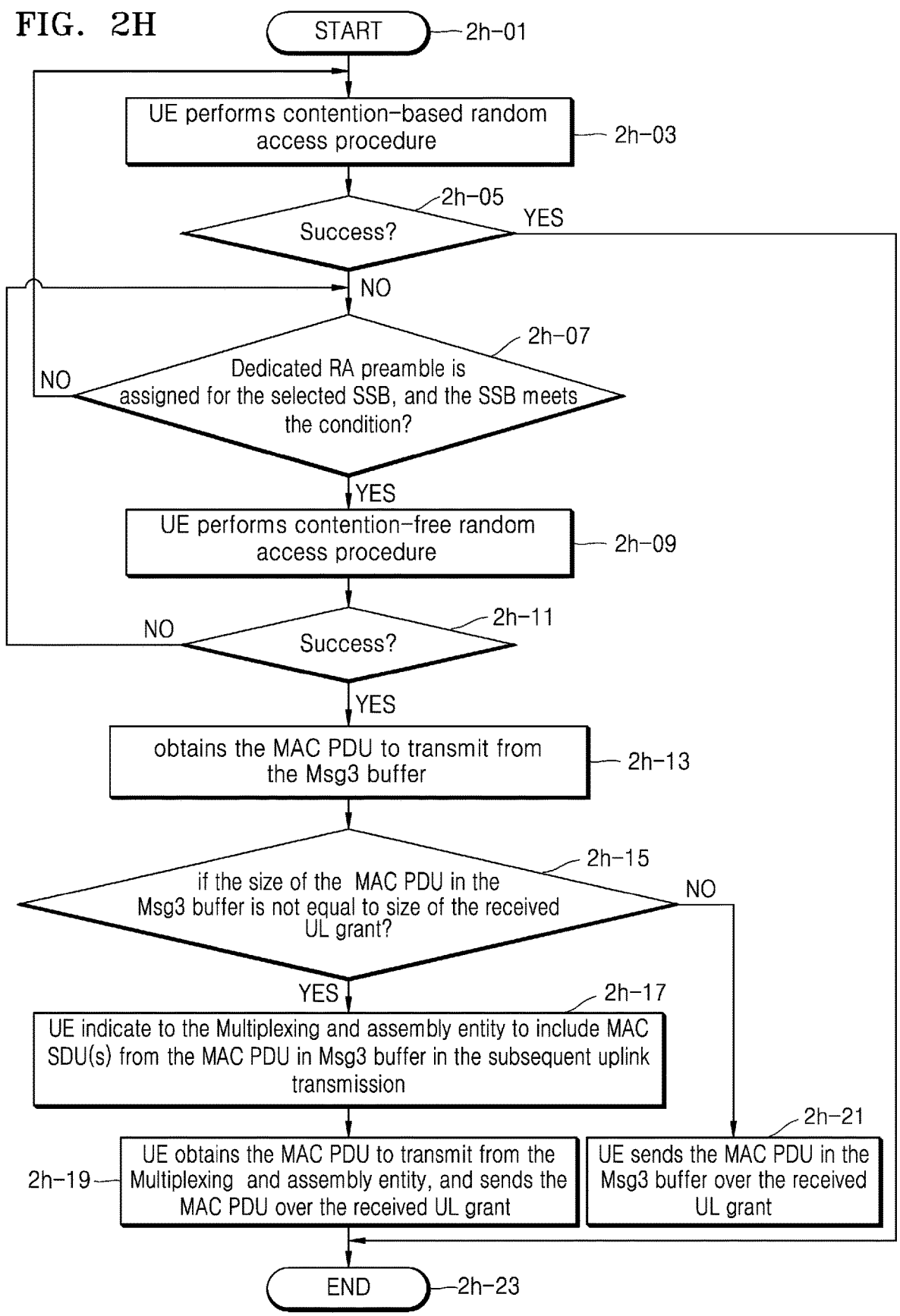
FIG. 2H is a diagram illustrating a procedure of operations of a UE according to Embodiment 4 of a method of generating and transmitting a message3 when the UE performs a random access embodiments of the disclosure.

FIG. 2H is a diagram illustrating a procedure of operations of a UE according to Embodiment 4 of a method of generating and transmitting a message3 when the UE performs a random access embodiments of the disclosure. In descriptions below, the UE may be replaced with the aforementioned MAC entity.

Referring to FIG. 2H, a situation is assumed, in which the UE is in a connected mode and first performs a contention-based random access procedure for handover as in the example of FIG. 2D (operation 2h-03). When the random access fails, the UE determines whether SSB/CSI-RS to which a dedicated random access preamble is assigned meets a condition configured by a BS (operation 2h-07), and when there are SSB/CSI-RS that meet the condition, the UE selects one of the SSB/CSI-RS and performs a contention-free random access by using a preamble assigned to the corresponding SSB/CSI-RS (operation 2h-09).

Afterward, the UE succeeds in the contention-free random access and determines whether the UE receives an RAR message in response to the preamble (operation 2h-11).

When it is successful, as there is data in an Msg3 buffer which is stored during a previous contention-free random access, the UE obtains a packet from the Msg3 buffer so as to transmit it (operation 2h-13). When the UE determines that a size of the obtained packet is different from a size of UL resource allocation received in the RAR message (or, when the UE determines that the size of the UL resource allocation received in the RAR message is greater) (operation 2h-15), the UE indicates a multiplexing and assembly entity (that is, a different entity other than the Msg3 buffer) in the UE to re-generate a MAC PDU from a packet stored in the Msg3 buffer, according to the size of the UL resource allocation received in the RAR message (operation 2h-17). Alternatively, when transmission of the preamble is not selected from among contention-based random access preambles (i.e., selection of a dedicated random access preamble) and the UE determines that the size of the obtained packet is different from the size of the UL resource allocation received in the RAR message (or, when the UE determines that the size of the UL resource allocation received in the RAR message is greater) (operation 2h-15), the UE may indicate the multiplexing and assembly entity (that is, the different entity other than the Msg3 buffer) in the UE to re-generate the MAC PDU from a packet stored in the Msg3 buffer, according to the size of the UL resource allocation received in the RAR message (operation 2h-17). When the UE indicates to re-generate the MAC PDU from the packet stored in the Msg3 buffer, the UE may indicate to re-generate the MAC PDU by excluding some MAC subPDUs and including some MAC subPDUs from among MAC subPDUs that were to be transmitted from the Msg3 buffer. For example, the UE may indicate to re-generate the MAC PDU by including a handover completion RRC message. Also, the UE may add, to the re-generated MAC PDU, a BSR MAC CE for reporting a buffer status so as to transmit UL data, but it is not necessary to include a MAC CE such as the aforementioned C-RNTI MAC CE in the Msg3 that occurs after the contention-free random access (because the BS already knows which UE has transmitted the preamble), and thus the MAC CE such as the aforementioned C-RNTI MAC CE may be excluded. Also, depending on necessity, the UE may include or may not include a PHR MAC CE for indicating remaining power for UL by the UE in the re-generated MAC PDU.

Afterward, although the packet is stored in the Msg3 buffer, the UE obtains the data from the multiplexing and assembly entity and then transmits the MAC PDU on the UL resource received in the RAR message (operation 2h-19). Otherwise, the UE transmits the packet stored in the Msg3 buffer, without a change to the packet, on the UL resource received in the RAR message (operation 2h-21).

Figure 2I:
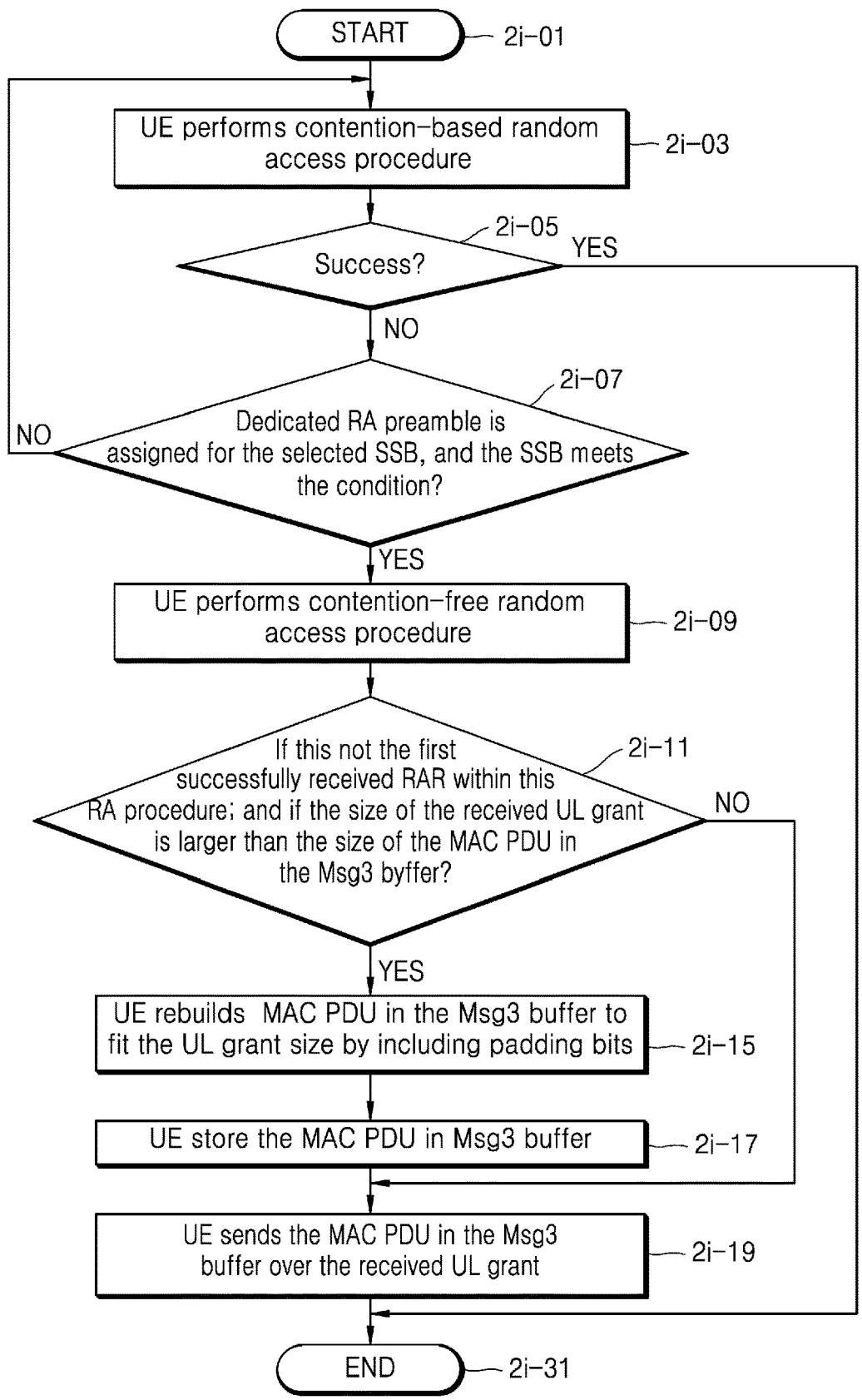
FIG. 2I is a diagram illustrating a procedure of operations of a UE according to Embodiment 5 of a method of generating and transmitting a message3 when the UE performs a random access embodiments of the disclosure.

FIG. 2I is a diagram illustrating a procedure of operations of a UE according to Embodiment 5 of a method of generating and transmitting a message3 when the UE performs a random access embodiments of the disclosure. In descriptions below, the UE may be replaced with the aforementioned MAC entity.

Referring to FIG. 2I, a situation is assumed, in which the UE is in a connected mode and first performs a contention-based random access procedure for handover as in the example of FIG. 2D (operation 2i-03). When the random access fails, the UE determines whether SSB/CSI-RS to which a dedicated random access preamble is assigned meets a condition configured by a BS (operation 2i-07), and when there are SSB/CSI-RS that meet the condition, the UE selects one of the SSB/CSI-RS and performs a contention-free random access by using a preamble assigned to the corresponding SSB/CSI-RS (operation 2i-09).

Afterward, when the UE succeeds in the contention-free random access and thus receives an RAR message about the preamble, the UE determines the following so as to transmit data on a UL resource assigned in the RAR message:

In a case where the RAR message is not a first RAR successfully received in a random access procedure, and the UE determines that a size of a MAC PDU stored in an Msg3 buffer is different from a size of UL resource allocation received in the RAR message (or, when the UE determines that the size of the UL resource allocation received in the RAR message is greater) (operation 2i-11), the UE generates a MAC PDU by adding only padding (padding bits) to a packet in the existing Msg3 buffer so as to fit to the size of the UL resource allocation received in the RAR message (operation 2i-15), and stores the MAC PDU in the Msg3 buffer (operation 2i-17).

Afterward, the UE determines whether a packet is stored in the Msg3 buffer, and when the packet is stored, the UE transmits the packet in the Msg3 buffer on the UL resource received in the RAR message (operation 2i-19).

Figure 2J:
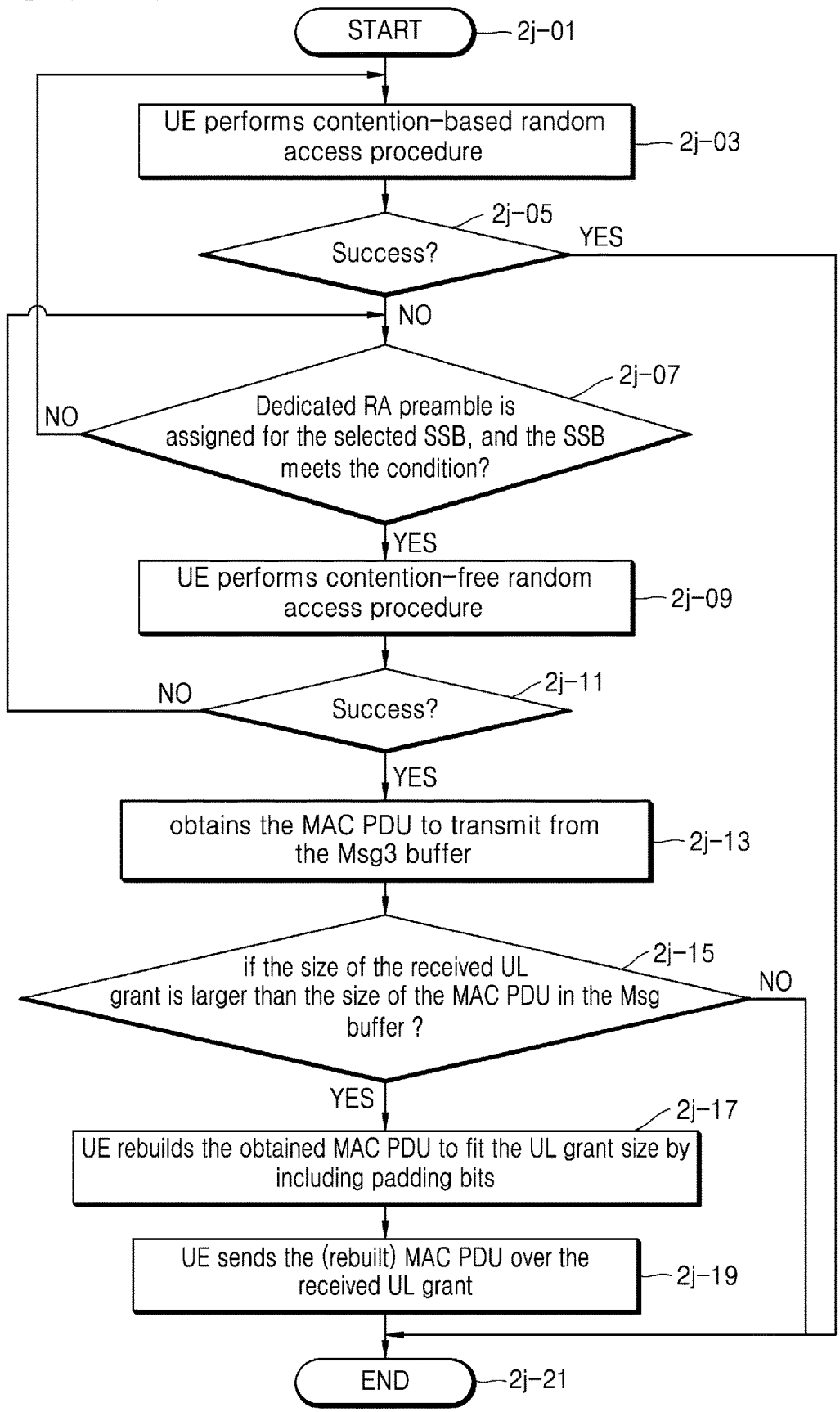
FIG. 2J is a diagram illustrating a procedure of operations of a UE according to Embodiment 6 of a method of generating and transmitting a message3 when the UE performs a random access embodiments of the disclosure.

FIG. 2J is a diagram illustrating a procedure of operations of a UE according to Embodiment 6 of a method of generating and transmitting a message3 when the UE performs a random access embodiments of the disclosure. In descriptions below, the UE may be replaced with the aforementioned MAC entity.

Referring to FIG. 2J, a situation is assumed, in which the UE is in a connected mode and first performs a contention-based random access procedure for handover as in the example of FIG. 2D (operation 2j-03). When the random access fails, the UE determines whether SSB/CSI-RS to which a dedicated random access preamble is assigned meets a condition configured by a BS (operation 2j-07), and when there are SSB/CSI-RS that meet the condition, the UE selects one of the SSB/CSI-RS and performs a contention-free random access by using a preamble assigned to the corresponding SSB/CSI-RS (operation 2j-09).

Afterward, the UE succeeds in the contention-free random access and determines whether the UE receives an RAR message in response to the preamble (operation 2j-11).

When it is successful, as there is data in an Msg3 buffer which is stored during a previous contention-free random access, the UE obtains a packet from the Msg3 buffer so as to transmit it (operation 2j-13). When the UE determines that a size of the obtained packet is different from a size of UL resource allocation received in the RAR message (or, when the UE determines that the size of the UL resource allocation received in the RAR message is greater) (operation 2j-15), the UE re-generates a MAC PDU by adding only padding to a packet in the existing Msg3 buffer so as to fit to the size of the UL resource allocation received in the RAR message (operation 2j-17). Alternatively, when transmission of the preamble is not selected from among contention-based random access preambles (i.e., selection of a dedicated random access preamble) and the UE determines that the size of the obtained packet is different from the size of the UL resource allocation received in the RAR message (or, when the UE determines that the size of the UL resource allocation received in the RAR message is greater) (operation 2j-15), the UE re-generates the MAC PDU by adding padding according to the size of the UL resource allocation received in the RAR message (operation 2j-17).

Afterward, the UE transmits the packet (the MAC PDU) on the UL resource received in the RAR message, the packet being re-generated according to the aforementioned procedure or obtained from the Msg3 buffer (operation 2*j*-19).

That is, the UE according to some embodiments of the disclosure may report detailed information about a most-recent successful random access, and in response thereto, the BS may appropriately allocate a random access channel to UEs in a cell. Also, the afore-described embodiments may each be implemented or may be implemented as a combination.

Figure 2K:
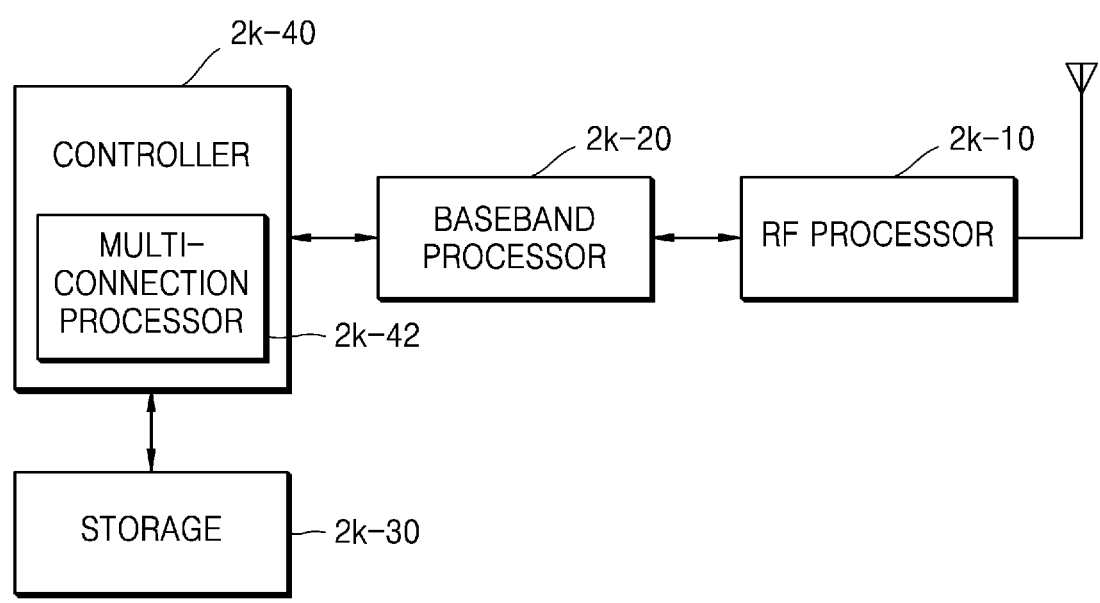
FIG. 2K illustrates a configuration of a UE in a wireless communication system according to some embodiments of the disclosure.

FIG. 2K illustrates a configuration of a UE in a wireless communication system according to some embodiments of the disclosure.

Referring to FIG. 2K, the UE includes a RF processor 2*k*-10, a baseband processor 2*k*-20, a storage 2*k*-30, and a controller 2*k*-40. However, the UE is not limited thereto and may include more elements than the elements shown in FIG. 2K or may include less elements than the shown elements.

Furthermore, the UE in the wireless communication system of FIG. 2K may correspond to the configuration of the UE of FIG. 1H. For example, the RF processor 2*k*-10 of FIG. 2K may correspond to the RF processor 1*h*-10 of FIG. 1H, and the baseband processor 2*k*-20 of FIG. 2K may correspond to the baseband processor 1*h*-20 of FIG. 1H. Also, the storage 2*k*-30 of FIG. 2K may correspond to the storage 1*h*-30 of FIG. 1H, and the controller 2*k*-40 of FIG. 2K may correspond to the controller 1*h*-40 of FIG. 1H.

The RF processor 2*k*-10 may perform functions for transmitting and receiving signals through radio channels, e.g., band conversion and amplification of the signals. That is, the RF processor 2*k*-10 may up-convert a baseband signal provided from the baseband processor 2*k*-20, into an RF band signal and then may transmit the RF band signal through an antenna, and may down-convert an RF band signal received through the antenna, into a baseband signal. For example, the RF processor 2*k*-10 may include a transmit filter, a receive filter, an amplifier, a mixer, an oscillator, a DAC, an ADC, or the like. Although only one antenna is illustrated in FIG. 2K, the UE may include a plurality of antennas. The RF processor 2*k*-10 may include a plurality of RF chains. The RF processor 2*k*-10 may perform beamforming. For beamforming, the RF processor 2*k*-10 may adjust phases and intensities of signals to be transmitted or received through a plurality of antennas or antenna elements. Also, the RF processor 2*k*-10 may perform a MIMO operation and may receive a plurality of layers in the MIMO operation. In response to the control by the controller 2*k*-40, the RF processor 2*k*-10 may perform received beam sweeping by appropriately configuring a plurality of antennas or antenna elements, or may adjust a direction and a beam width of a received beam to coordinate with a transmit beam.

The baseband processor 2*k*-20 may convert between a baseband signal and a bitstream based on physical entity specifications of a system. For example, for data transmission, the baseband processor 2*k*-20 may generate complex symbols by encoding and modulating a transmit bitstream. For data reception, the baseband processor 2*k*-20 may reconstruct a received bitstream by demodulating and decoding a baseband signal provided from the RF processor 2*k*-10. For example, according to an OFDM scheme, for data transmission, the baseband processor 2*k*-20 may generate complex symbols by encoding and modulating a transmit bitstream, may map the complex symbols to subcarriers, and then may configure OFDM symbols by performing IFFT and CP insertion. For data reception, the baseband processor 2*k*-20 may segment a baseband signal provided from the RF processor 2*k*-10, into OFDM symbol units, may reconstruct signals mapped to subcarriers by performing FFT, and then may reconstruct a received bitstream by demodulating and decoding the signals.

The baseband processor 2*k*-20 and the RF processor 2*k*-10 may transmit and receive signals as described above. Accordingly, the baseband processor 2*k*-20 and the RF processor 2*k*-10 may also be called a transmitter, a receiver, a transceiver, or a communicator. Also, at least one of the baseband processor 2*k*-20 and the RF processor 2*k*-10 may include a plurality of communication modules to support a plurality of different radio access technologies. Also, at least one of the baseband processor 2*k*-20 and the RF processor 2*k*-10 may include different communication modules to process signals of different frequency bands. For example, the different radio access technologies may include a wireless LAN (e.g., IEEE 802.11), a cellular network (e.g., LTE), or the like. The different frequency bands may include a SHF (e.g., 2.5 GHz, 5 GHz) band and an mmWave (e.g., 60 GHz) band. The UE may transmit and receive signals to and from the BS by using the baseband processor 2*k*-20 and the RF processor 2*k*-10. In this regard, the signals may include control information and data.

The storage 2*k*-30 may store basic programs, application programs, and data, e.g., configuration information, for operations of the UE. In particular, the storage 2*k*-30 may store information related to a wireless LAN node that performs wireless communication by using a wireless LAN access technology. Furthermore, the storage 2*k*-30 may provide the stored data upon request by the controller 2*k*-40. The storage 2*k*-30 may include any or a combination of storage media such as ROM, RAM, a hard disk, a CD-ROM, and a DVD. The storage 2*k*-30 may include a plurality of memories. According to some embodiments, the storage 2*k*-30 may store a program for performing the wireless communication method for re-generating and transmitting data stored in an Msg3 buffer in the aforementioned random access procedure.

The controller 2*k*-40 may control overall operations of the UE. For example, the controller 2*k*-40 transmits and receives signals through the baseband processor 2*k*-20 and the RF processor 2*k*-10. Furthermore, the controller 2*k*-40 records and reads data on or from the storage 2*k*-30. To this end, the controller 2*k*-40 may include at least one processor. For example, the controller 2*k*-40 may include a CP for controlling communications and an AP for controlling an upper layer such as an application program. According to some embodiments of the disclosure, the controller 2*k*-40 may include a multi-connection processor 2*k*-42 for processing operations of a multi-connection mode. For example, the controller 2*k*-40 may control the UE to perform illustrated processes in an operation of the UE which is described with reference to at least one of FIGS. 2E to 2J.

In a random access, the controller 2*k*-40 according to some embodiments of the disclosure determines whether a size of a packet in the Msg3 buffer is different from a size of an UL resource received via a RAR, and when it is different, the controller 2*k*-40 may generate Msg3 according to the aforementioned embodiment and thus may transmit data on the corresponding resource. Furthermore, at least one element in the UE may be implemented as a chip.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including RAM or flash memory, ROM, EEPROM, a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a LAN, a WLAN, and a SAN. Such a storage device may access, via an external port, the electronic device that performs embodiments of the disclosure. Furthermore, an additional storage device on the communication network may access the electronic device that performs embodiments of the disclosure.

In the afore-described embodiments of the disclosure, an element or elements included in the disclosure are expressed in a singular or plural form depending on the described embodiments of the disclosure. However, the singular or plural form is selected appropriately for a situation assumed for convenience of description, the disclosure is not limited to the singular or plural form, and an element expressed in a singular form may include a plurality of elements and elements expressed in a plural form may include a single element.

Specific embodiments of the disclosure are described in the descriptions of the disclosure, but it will be understood that various modifications may be made without departing the scope of the disclosure. Thus, the scope of the disclosure is not limited to the embodiments described herein and should be defined by the appended claims and their equivalents.

What is claimed is:

1. A method of performing a random access procedure, the method being performed by a user equipment (UE) and comprising:
    transmitting, as a response to a first random access response (RAR), a message3 (Msg3) for a contention-based random access comprising a first media access control protocol data unit (MAC PDU), wherein the first MAC PDU comprises a cell-radio network temporary identifier MAC control element (C-RNTI MAC-CE) and a radio resource control (RRC) message for a handover completion, and the first MAC PDU is stored in a Msg3 buffer;
    if the Msg 3 is transmitted, determining whether contention resolution for the contention-based random access is considered successful; and
    in case that the contention resolution for the contention-based random access is considered not successful, performing a contention-free random access procedure,
    wherein the performing of the contention-free random access procedure comprises:
        transmitting a contention-free random access preamble;
        receiving a second RAR corresponding to the contention-free random access preamble;
        in case that a size of UL resource allocation in the second RAR does not match with a size of the first MAC PDU obtained from the Msg3 buffer, obtaining a second MAC PDU including at least one MAC subprotocol data unit (MAC subPDU), wherein the at least one MAC subPDU includes the RRC message for the handover completion which is comprised in the first MAC PDU obtained from the Msg3 buffer; and
        transmitting the second MAC PDU.

2. The method of claim 1, wherein the second MAC PDU is obtained from a multiplexing and assembly entity.

3. The method of claim 1, further comprising deleting the first MAC PDU in the Msg3 buffer.

4. The method of claim 1, wherein the at least one MAC subPDU includes a power headroom report (PHR) MAC-CE.

5. A user equipment (UE) performing a random access procedure, the UE comprising:
    a transceiver; and
    at least one controller coupled with the transceiver and configured to:
        transmit, as a response to a first random access response (RAR), a message3 (Msg3) for a contention-based random access comprising a first media access control protocol data unit (MAC PDU), wherein the first MAC PDU comprises a cell-radio network temporary identifier MAC control element (C-RNTI MAC-CE) and a radio resource control (RRC) message for a handover completion, and the first MAC PDU is stored in a Msg3 buffer,
        if the Msg 3 is transmitted, determine whether contention resolution for the contention-based random access is considered successful, and
        in case that the contention resolution for the contention-based random access is considered not successful, perform a contention-free random access procedure,
    wherein the contention-free random access procedure comprises:
        transmit, a contention-free random access preamble,
        receive, a second RAR corresponding to the contention-free random access preamble,
        in case that a size of UL resource allocation in the second RAR does not match with a size of the first MAC PDU obtained from the Msg3 buffer, obtain a second MAC PDU including at least one MAC subprotocol data unit (MAC subPDU), wherein the at least one MAC subPDU includes the RRC message for the handover completion which is comprised in the first MAC PDU obtained from the Msg3 buffer, and
        transmit the second MAC PDU.

6. The UE of claim 5, wherein the second MAC PDU is obtained from a multiplexing and assembly entity.

7. The UE of claim 5, wherein the at least one controller is further configured to delete the first MAC PDU in the Msg3 buffer.

8. The UE of claim 5, wherein the at least one MAC subPDU includes a power headroom report (PHR) MAC-CE.

9. The method of claim 1, wherein the at least one MAC subPDU includes a buffer status report (BSR) MAC CE.

10. The UE of claim 5, wherein the at least one MAC subPDU includes a buffer status report (BSR) MAC CE.

* * * * *